United States Patent
Nakamura

(10) Patent No.: US 9,690,514 B2
(45) Date of Patent: Jun. 27, 2017

(54) APPARATUS, METHOD AND MEDIUM

(71) Applicant: FUJITSU LIMITED, Kawasaki-shi, Kanagawa (JP)

(72) Inventor: Minoru Nakamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 77 days.

(21) Appl. No.: 14/972,940

(22) Filed: Dec. 17, 2015

(65) Prior Publication Data
US 2016/0188214 A1  Jun. 30, 2016

(30) Foreign Application Priority Data

Dec. 24, 2014 (JP) ................... 2014-260962

(51) Int. Cl.
G06F 12/00 (2006.01)
G06F 3/06 (2006.01)

(52) U.S. Cl.
CPC ............ *G06F 3/0656* (2013.01); *G06F 3/064* (2013.01); *G06F 3/0611* (2013.01); *G06F 3/0673* (2013.01)

(58) Field of Classification Search
None
See application file for complete search history.

(56) References Cited

U.S. PATENT DOCUMENTS 6,643,754 B1  11/2003  Challenger et al.

FOREIGN PATENT DOCUMENTS

| JP | 2004-206733 | 7/2004 |
| JP | 2008-3932 | 1/2008 |
| JP | 2008-46727 | 2/2008 |

OTHER PUBLICATIONS

Rosenblum et al, The Design and Implementation of a Log-Structured File System, 1991.*

* cited by examiner

*Primary Examiner* — Duc Doan
(74) *Attorney, Agent, or Firm* — Staas & Halsey LLP

(57) ABSTRACT

An apparatus includes: processing circuitry configured to extract first information from a first target data which includes a plurality of data blocks, the first information corresponding to third information which is included in a last data block of the plurality of data blocks, the first target data being to be written to a first segment of a storage medium; extract second information from a second target data which is to be written to a second segment of the storage medium after writing the first target data to the first segment, the second information corresponding to fourth information which is included in the second target data; generate first write data by adding the first information and the second information to the first target data; and write the first write data to the first segment of the storage medium.

18 Claims, 23 Drawing Sheets

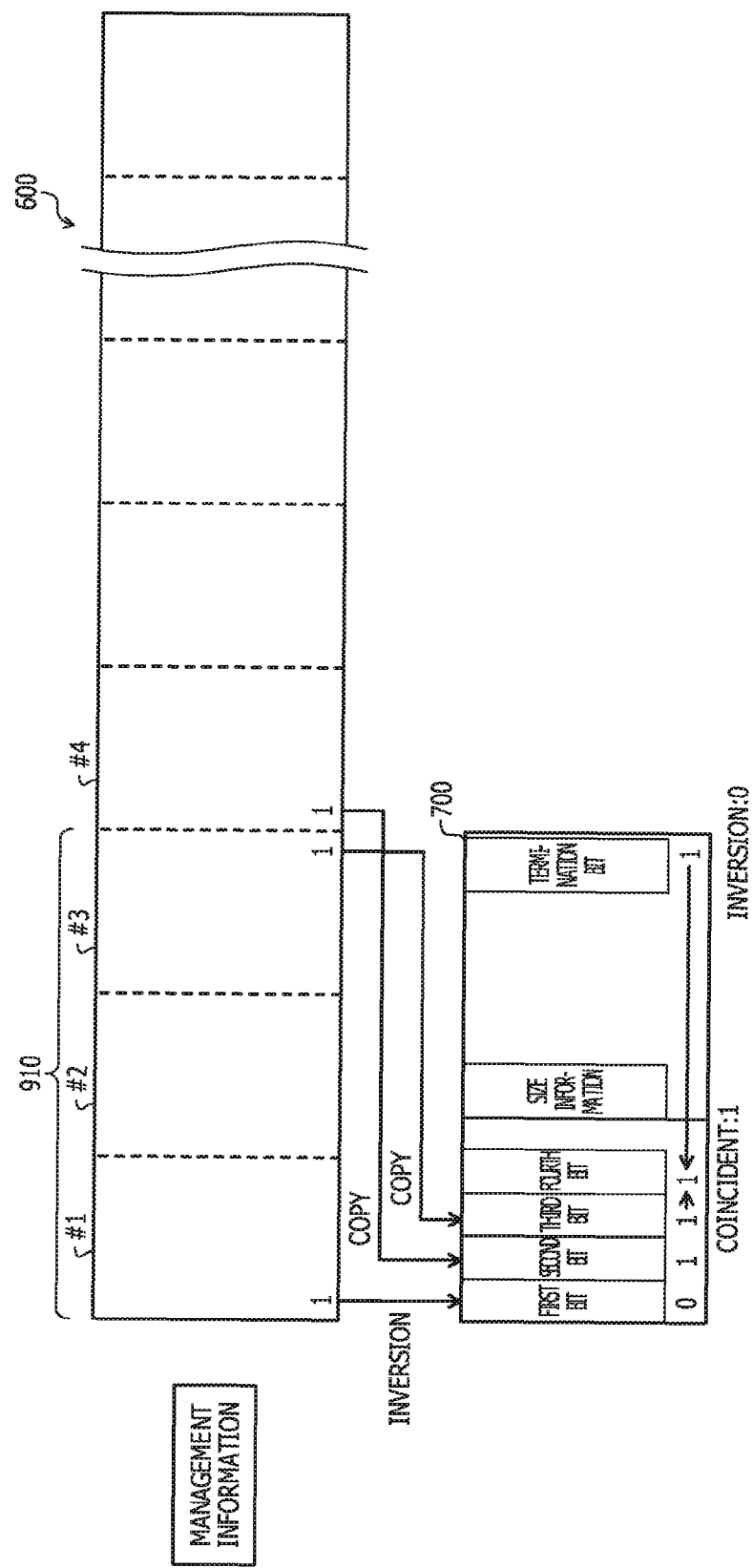

APPARATUS, METHOD AND MEDIUM

CROSS-REFERENCE TO RELATED APPLICATION

This application is based upon and claims the benefit of priority of the prior Japanese Patent Application No. 2014-260962, filed on Dec. 24, 2014, the entire contents of which are incorporated herein by reference.

FIELD

The embodiments discussed herein are related to an apparatus, a method and a medium.

BACKGROUND

In the related art, there is a log-structured scheme as one of the schemes for managing a storage region of a hard disk drive (HDD), a solid state drive (SSD), or the like. In the log-structured scheme, contiguous storage regions of an HDD, SSD, or the like are handled as a ring buffer, and data is sequentially written from the top of the ring buffer. In data writing processing, data is written in units of blocks from a writing start position in the ring buffer, and management information that indicates a termination position of the data writing is written in a storage region that is different from the ring buffer.

There is a related technique in which if the amount of data written in a first storage region in a storage unit exceeds a set data amount, optimized data is generated by optimizing the data written in the first storage region and is then written in a second storage region, for example. In addition, there is another technique of referring to a redundant region corresponding to a first sector region and a redundant region corresponding to a second sector region in a parallel manner, for example. Moreover, there is also a technique of holding a first pointer, which is for determining a first free byte in a first block of a memory, in a main memory, for example.

As examples in the related art, Japanese Laid-open Patent Publication Nos. 2008-3932, 2008-46727, and 2004-206733 are known.

SUMMARY

According to an aspect of the invention, an apparatus includes: processing circuitry configured to extract first information from a first target data which includes a plurality of data blocks, the first information corresponding to third information which is included in a last data block of the plurality of data blocks, the first target data being to be written to a first segment of a storage medium; extract second information from a second target data which is to be written to a second segment of the storage medium after writing the first target data to the first segment, the second information corresponding to fourth information which is included in the second target data; generate first write data by adding the first information and the second information to the first target data; and write the first write data to the first segment of the storage medium.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is an explanatory diagram illustrating another example in which the written data is generated;

DESCRIPTION OF EMBODIMENTS

According to the aforementioned techniques in the related art, a command for writing management information that indicates a termination position of data writing is generated in addition to a command for writing data when the data is written in a storage region to which a management scheme such as a log-structured scheme is applied, and time for performing the data writing processing increases.

According to an aspect, an object of the embodiments is to reduce the time for performing the data writing processing.

Hereinafter, detailed descriptions will be given of embodiments of an information recording program, an information recording method, and an information recording apparatus with reference to drawings.

Embodiment of Information Recording Method

First, a description will be given of an information recording method according to an embodiment with reference to FIG. 1.

Figure 1:
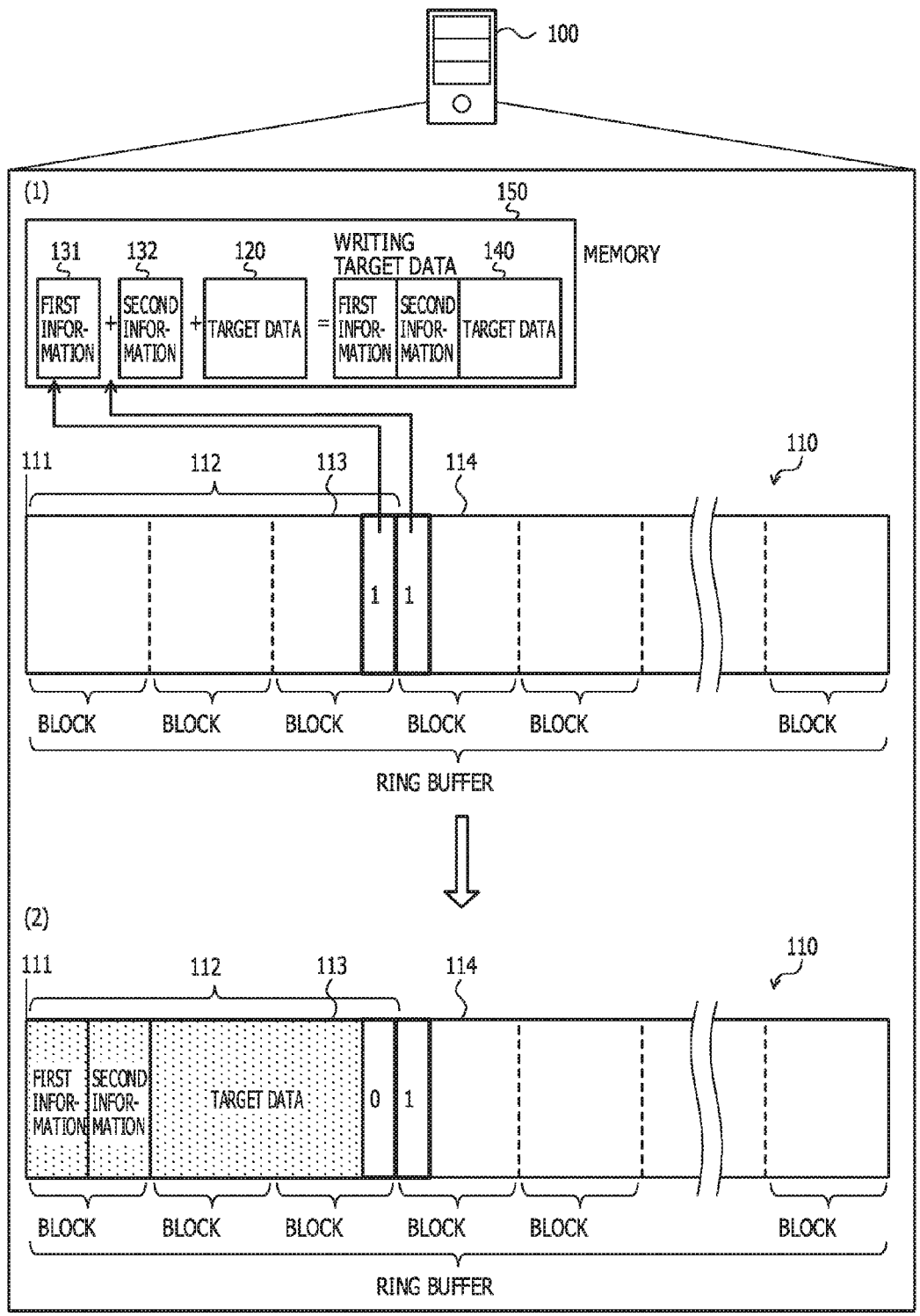
FIG. 1 is an explanatory diagram illustrating an information recording method according to an embodiment.

FIG. 1 is an explanatory diagram illustrating an information recording method according to the embodiment. In FIG. 1, an information recording apparatus 100 is a computer that includes a storage device such as an HDD or an SSD. The storage device such as an HDD or an SSD is a device that includes a storage medium divided into storage regions in units of blocks and the storage device controls writing of data in units of blocks in the storage medium. A block is a storage region with a predetermined size. The block is a 512-byte or 4096-byte storage region, for example. In the example illustrated in FIG. 1, one block is assumed to be a 512-byte storage region. If a plurality of writing commands are received, the storage device performs processing on the received plurality of writing commands in turn. In addition, the storage device can read data from any of the blocks in the storage regions.

The information recording apparatus 100 realizes a system, such as a file system or a relational database management system, by using the storage device such as an HDD or an SSD and performs processing of writing data, such as a log, a file, or a directory, in one or more blocks. The size of data is set before performing the writing processing.

There is a case where writing of a remaining part of data in a second half of the plurality of blocks is not available for the information recording apparatus 100 while another part of the data has already been written in a first half of the blocks when processing of writing the data in the plurality of blocks is performed. Such a situation in which only part of the data is successfully written is called partial writing in some cases. The information recording apparatus 100 fails to write data in the second and subsequent blocks since power supply to the information recording apparatus 100 is stopped immediately after the information recording apparatus 100 successfully writes data in the top block from among the plurality of blocks, for example.

Accordingly, the information recording apparatus 100 employs a log-structured scheme as a scheme for managing the storage regions on the storage medium that is included in the storage device such as an HDD or an SSD in some cases. The information recording apparatus 100 handles contiguous storage regions of the storage medium that is included in the storage device such as an HDD or an SSD, for example, as a buffer and writes data by sequentially using one or more blocks from the top block in the contiguous storage regions. The contiguous storage regions are at least logically contiguous storage regions. The contiguous storage regions do not have to be physically contiguous storage regions. The buffer is a ring buffer 110, for example. The ring buffer is formed of storage regions, the top and the termination of which are logically coupled. The buffer is not restricted to being a ring buffer.

Here, a case can be considered in which every time writing of data is completed, the information recording apparatus 100 writes management information that indicates a termination position of data writing, in a storage region that is different from the ring buffer 110 such that a writing start position from which writing is started when the next data following the data is written can be specified. The termination of data writing is a termination of a storage region, in which writing of the data has been completed, in the ring buffer 110.

However, in such a case, the information recording apparatus 100 also issues, as the writing processing, a writing command for writing management information in a storage region that is different from the ring buffer 110 in addition to the writing command for writing the data in the ring buffer 110 as the writing processing. As a result, time for the writing processing increases. Furthermore, operations of writing the management information increase as a frequency of writing data increases in the system, which brings about degradation in the performance of the system. Thus, a description will be given of an information recording method by which it is possible to reduce the time for the data writing processing in this embodiment.

The information recording apparatus 100 executes an information recording program according to the embodiment and realizes the information recording method according to the embodiment. The information recording apparatus 100 receives data 120 to be written in the storage medium and then performs writing processing (1) and (2) described below to write the data 120 in the storage medium. In the following description, the received data 120 will also be referred to as "target data 120". The size of the target data is variable. The size of the target data may be fixed.

(1) The information recording apparatus 100 receives the target data 120 and then generates writing target data 140 corresponding to a first number of blocks, which includes first information 131, second information 132, and the target data 120, for example, in a memory 150 in the information recording apparatus 100. The writing target data is referred to as a segment, for example, in some cases.

The first number of blocks are a positive number of blocks, and are a number of blocks in which at least the first information 131, the second information 132, and the target data 120 can be written. The first number of blocks are "three" or more blocks since it is possible to write 1-bit first information 131, 1-bit second information 132, and 1500-byte target data 120, for example, by using a 1536-byte storage region corresponding to three blocks. The first number of blocks may be a fixed number of blocks as long as the target data has a fixed length.

The first information 131 is information that indicates a value of a termination block corresponding to the first number of blocks from a writing start position 111 on the ring buffer 110 in the storage medium. The first information 131 is information that indicates a value of a first position in the termination block corresponding to the first number of blocks from the writing start position 111 on the ring buffer 110 in the storage medium, for example. The first position is a termination position on the block, for example. The writing start position 111 is a head position of an arbitrary unwritten block. The writing start position 111 is a position at which the head part of the writing target data 140 is written, for example. The first number of blocks corresponds to the storage region as a writing destination of the writing target data 140 in the current writing processing. In the following description, the first number of blocks will also be referred to as a "writing destination region". In the example illustrated in FIG. 1, the first information 131 is assumed to be a 1-bit value.

The second information 132 is information that indicates a value of a block, which follows the termination block in the writing destination region with the second number of blocks interposed therebetween. The second number of blocks are a predetermined positive number of blocks, and the second number is equal to or less than a lower limit of the first block number. The second number is "1" when the lower limit of the first block number is "1", for example. The second information 132 is a value at the second position on the block, which follows the termination block in the writing destination region with the second number of blocks interposed therebetween, for example. The second position is a head position on the block, for example. The block, which follows the termination block in the writing destination region with the second number of blocks interposed therebetween, is a block in the storage region, which is scheduled to be a writing destination of the next writing target data in the writing processing to be next performed. In the following description, the block, which follows the termination block in the writing destination region with the second number of blocks interposed therebetween, will also be referred to as a "writing scheduled block". In the example illustrated in FIG. 1, the second information 132 is assumed to be a 1-bit value.

Specifically, if 1500-byte target data 120 is received, the information recording apparatus 100 specifies the number "3" of blocks in which the first information 131, the second information 132, and the target data 120 can be written. Next, the information recording apparatus 100 reads, as the first information 131, a 1-bit value "1" at a termination position on a termination block 113 of the writing destination region 112 as the storage region corresponding to three blocks from the writing start position 111 on the ring buffer 110 of the storage medium. In addition, the information recording apparatus 100 reads, as the second information 132, a 1-bit value "1" at a head position on a writing scheduled block 114 as a block, which follows the termination block 113 in the writing destination region 112 with one block interposed therebetween.

Then, the information recording apparatus 100 generates data 140 which includes the first information 131, the second information 132, and the target data 120 and which is to be written in the writing destination region 112. Here, the information recording apparatus 100 may generate the writing target data 140, which further includes padding data, in a case in which the total data size of the first information 131, the second information 132, and the target data 120 is less than the length corresponding to three blocks. The padding data is data for adjusting the size of the writing target data 140 and setting the size of the writing target data 140 to be a multiple number of the blocks. In the example illustrated in FIG. 1, the first information 131 and the second information 132 are included in data from the head of the writing target data 140 in the head block in the writing destination region 112 to the 512-th byte.

In doing so, the information recording apparatus 100 can hold a value of the termination block 113 of the writing destination region 112 of the current writing target data 140 in a state before writing the current writing target data 140 as the first information 131 in the writing target data 140. The first information 131 does not coincide with the value of the termination block 113 of the writing destination region 112 if the current writing target data 140 is written and the value of the termination block 113 of the writing destination region 112 is rewritten. In other words, it is possible to guarantee that the writing of the current writing target data 140 has been completed if the first information 131 does not coincide with the value of the termination block 113 of the writing destination region 112.

Similarly, the information recording apparatus 100 can hold the value of the writing scheduled block 114 of the next writing target data before writing the next writing target data, as the second information 132 in the writing target data 140. If the next writing target data is written and the value of the writing scheduled block 114 is rewritten, the second information 132 does not coincide with the value of the writing scheduled block 114. In other words, it is possible to guarantee that the writing of the next writing target data has been started and the writing of the data corresponding to the second number of blocks from the head of the next writing target data has been completed in a case in which the second information 132 does not coincide with the value of the writing scheduled block 114. In contrast, the second information 132 does not guarantee that the writing of the next writing target data has been entirely completed.

(2) The information recording apparatus 100 writes the generated writing target data 140 from the writing start position 111 on the ring buffer 110 of the storage medium. Here, the information recording apparatus 100 causes the storage device to write the writing target data 140 in the ring buffer 110 of the storage medium in units of blocks by dividing the writing target data 140 in units of blocks and sequentially transmitting writing commands for the respective divided data items to the storage device. The information recording apparatus 100 may cause the storage device to write the writing target data 140 in the ring buffer 110 of the storage medium in units of blocks by transmitting the writing commands for the writing target data 140.

The information recording apparatus 100 transmits a writing command for data from the head of the writing target data 140 to the 512-th byte, for example, to the storage device and causes the storage device to write the data in the head block in the writing destination region 112. The information recording apparatus 100 transmits a writing command for data from the 513-th byte to the 1024-th byte of the writing target data 140 to the storage device and causes the storage device to write the data in the second block in the writing destination region 112. The information recording apparatus 100 transmits a writing command for data from the 1025-th byte to the 1536-th byte of the writing target data 140 to the storage device and causes the storage device to write the data in the termination block 113 of the writing destination region 112.

In doing so, the information recording apparatus 100 can write, along with the target data 120, the first information 131 which depends on whether or not the current writing target data 140 has successfully been written and changes a state in relation to whether or not the first information 131 coincides with the value of the termination block 113 of the writing destination region 112. Similarly, the information recording apparatus 100 can write, along with the target data 120, the second information 132 which depends on whether or not writing of the next writing target data has been started and changes a state in relation to whether or not the second information 132 coincides with the value of the writing scheduled block 114 of the next writing target data.

Therefore, the information recording apparatus 100 can create a state in which it is possible to determine whether or not the writing of the current writing target data 140 has been completed and whether or not the writing of the next writing target time has been started, based on the first information 131 and the second information 132 without updating the management information. Therefore, the information recording apparatus 100 can specify the termination position of the data writing without writing the management information in the storage region that is different from the ring buffer 110 and does not have to issue the writing command for the management information.

As a result, the information recording apparatus 100 can reduce the time for the writing processing. Specifically, the information recording apparatus 100 does not write the management information by attempting to read the first information 131 and the second information 132 but does in the writing processing and does not take time to write the management information. Here, since there is a characteristic that the time for reading the first and second information from the storage medium is shorter than the time for writing the management information in the storage medium, the information recording apparatus 100 can reduce the time for the writing processing. In addition, the information recording apparatus 100 can reduce the time for reading the first information 131 and the second information 132 by holding data that has been read once in a cache memory and can further reduce the time for the writing processing.

Although the description was given hitherto of the case in which the first information 131 and the second information 132 are included in the writing target data 140 as data that is to be written in the head block in the first number of blocks, the embodiment is not limited thereto. For example, the first information 131 and the second information 132 may be included in the writing target data 140 as data that is to be written in the i-th block in the first number of blocks. "i" is a natural number that is equal to or greater than two. In such a case, the size of the writing target data 140 is adjusted to be greater than the length of i blocks by adding the padding data to the writing target data 140. In such a case, the target data 120 may be divided into data that is included before the first information 131 and the second information 132 in the writing target data 140 and data that is included after the first information 131 and the second information 132. In such a case, the second information 132 may be information that indicates a value of a block, which follows the termination block in the first number of blocks with i blocks interposed therebetween. In doing so, it is possible to guarantee that the first information and the second information of the next writing target data have been written in a case in which the second information 132 does not coincide with the value of the writing scheduled block 114.

In addition, the first information 131 and the second information 132 may be included in the writing target data 140 as data that is to be written in the i-th block in the first number of blocks only in a case in which the size of the target data 120 is greater than the length of the i−1 blocks.

In addition, the information recording apparatus 100 can guarantee that the writing of the data of the second number of blocks from the head of the writing target data 140, which is currently performed, has been completed based on the second information that is included in the previous writing target data if previous writing target data exists. Accordingly, the first information 131 and the second information 132 may be included in the data of the second number of blocks from the head of the current writing target data 140. In doing so, the information recording apparatus 100 can guarantee that the writing of the first information 131 and the second information 132 in the current writing target data 140 has been completed, based on the second information that is included in the previous writing target data.

Although the description was given hitherto of the case in which the first information 131 was the 1-bit value, the embodiment is not limited thereto. The first information 131 may be a value that is equal to or greater than 2 bits, for example. In addition, the first information 131 may be a combination of a value at the head position and a value at the termination position on the block instead of values at contiguous positions. Although the description was given hitherto of the case in which the second information 132 was a value that is equal to or greater than 1 bit, the embodiment is not limited thereto. The second information 132 may be a value that is equal to or greater than 2 bits. In addition, the second information 132 may be a combination of a value at the head position and a value at the termination position on the block instead of values at contiguous positions.

Although the description was given hitherto of the case in which the first information 131 is a 1-bit value of the termination block 113 of the writing destination region 112, the embodiment is not limited thereto. For example, the first information 131 may be a value obtained by inverting the 1-bit value of the termination block 113 of the writing destination region 112, or may be a sum of values of a plurality of bits of the termination block 113 of the writing destination region 112. Although the description was given hitherto of the case in which the second information 132 was a 1-bit value of the writing scheduled block 114 of the next writing target data, the embodiment is not limited thereto. For example, the second information 132 may be a value obtained by inverting the 1-bit value of the writing scheduled block 114 of the next writing target data, or may be a sum of values of a plurality of bits of the writing scheduled block 114 of the next writing target data.

Although the description was given hitherto of the case in which the information recording apparatus 100 generated the first information 131, the embodiment is not limited thereto. For example, the information recording apparatus 100 may omit the generation of the first information 131 when the writing target data 140 is data corresponding to one block since a failure of the writing of only part of the writing target data 140 does not occur and only results that writing of the entire writing target data 140 has successfully been made or has been failed are obtained.

Although the description was given hitherto of the case in which when a plurality of writing commands were received, the storage device processed the plurality of received writing commands in the received order, the embodiment is not limited thereto. For example, the storage device may process the plurality of received writing commands in an order that is different from the received order. In such a case, the information recording apparatus 100 controls the order of processing the plurality of writing commands by the storage device. First, the information recording apparatus 100 transmits, to the storage device, a writing command for data that includes the first information 131 and the second information 132 to be written in the head block of the writing destination region and waits for notification indicating that completion of the writing from the storage device. Next, the information recording apparatus 100 transmits, to the storage device, a writing command for data to be written from a block after the head block in the writing destination region 112 to a block immediately before the termination block and waits for notification indicating that completion of the writing. Finally, the information recording apparatus 100 transmits, to the storage device, a writing command for data to be written in the termination block of the writing destination region 112.

One Example of Computer System 200

Next, a description will be given of an example of a computer system 200, to which the information recording method illustrated in FIG. 1 is applied, with reference to FIG. 2.

Figure 2:
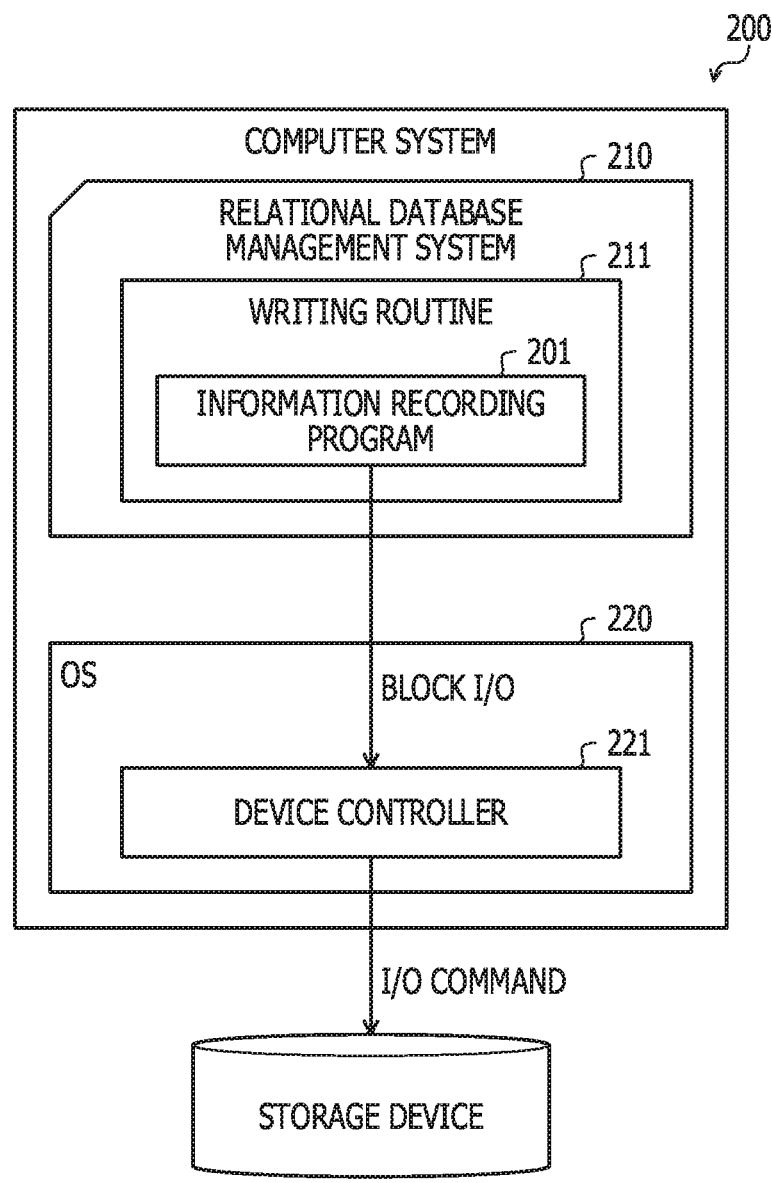
FIG. 2 is an explanatory diagram illustrating an example of a computer system.

FIG. 2 is an explanatory diagram illustrating an example of the computer system 200. In FIG. 2, the computer system 200 is realized by the information recording apparatus 100 illustrated in FIG. 1. The computer system 200 is a relational database management system 210, which operates on a user land, to which an information recording program 201 according to the embodiment is applied. For example, the information recording program 201 is applied to a writing routine 211 of writing, as a transaction log, content of an operation such as addition of data to a database, updating of data in the database, or deletion of data from the database in the relational database management system 210, for example. The writing routine 211 is for writing a transaction log in the storage device via a device controller 221 of an operating system (OS) 220 that operates on a kernel. The relational data management system 210 employs binlog of MySQL (registered trademark), write ahead logging (WAL) of PostgreSQL (registered trademark), or the like as the transaction log, for example. In addition, the information recording apparatus 100 may create the relational database management system 210 in an external storage device that is coupled via a storage adaptor.

Another Example of Computer System 200

Next, a description will be given of another example of the computer system 200, to which the information recording method illustrated in FIG. 1 is applied, with reference to FIG. 3.

Figure 3:
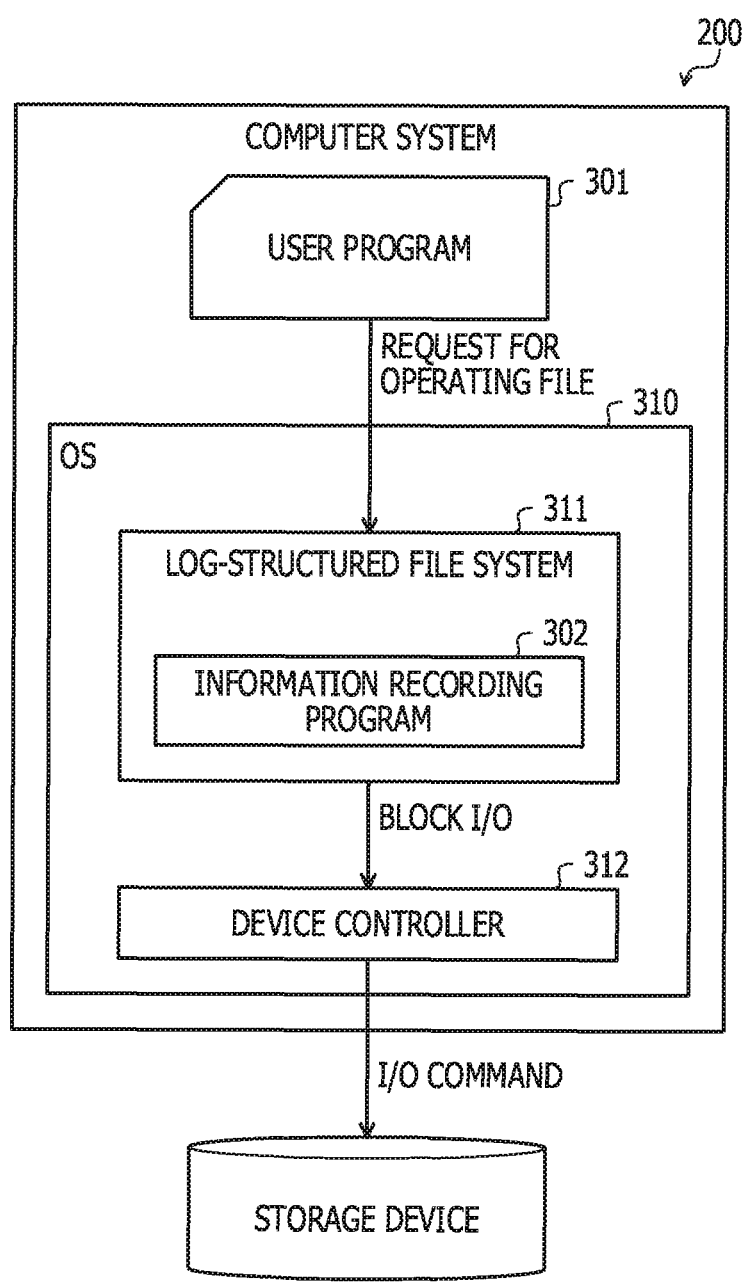
FIG. 3 is an explanatory diagram illustrating another example of the computer system.

FIG. 3 is an explanatory diagram illustrating another example of the computer system 200. In FIG. 3, the computer system 200 is realized by the information recording apparatus 100 illustrated in FIG. 1. The computer system 200 is a log-structured file system 311, which operates on a kernel, to which an information recording program 302 according to the embodiment is applied. For example, the log-structured file system 311 receives via a device controller 312 a file operation request from a user program 301 on an OS 310 that operates on the kernel and writes the file in the storage device. The log-structured file system 311 is, for example, a log-structured file system (Log FS), a new implementation of a log-structured file system 2 (NILFS2), or the like. In addition, the information recording apparatus 100 may create the log-structured file system in an external storage device that is coupled via a storage adaptor.

Although the description was given hitherto of the case in which the information recording method illustrated in FIG. 1 was realized by applying the information recording program to the user land or the kernel of the information recording apparatus 100 in the computer system 200, the embodiment is not limited thereto. For example, the information recording method illustrated in FIG. 1 may be realized by applying the information recording program to a storage device such as an HDD or an SSD in the computer system 200.

Hardware of Information Recording Apparatus 100

Next, a description will be given of an example of hardware of the information recording apparatus 100, which realizes the computer system 200 illustrated in FIGS. 2 and 3, with reference to FIG. 4.

Figure 4:
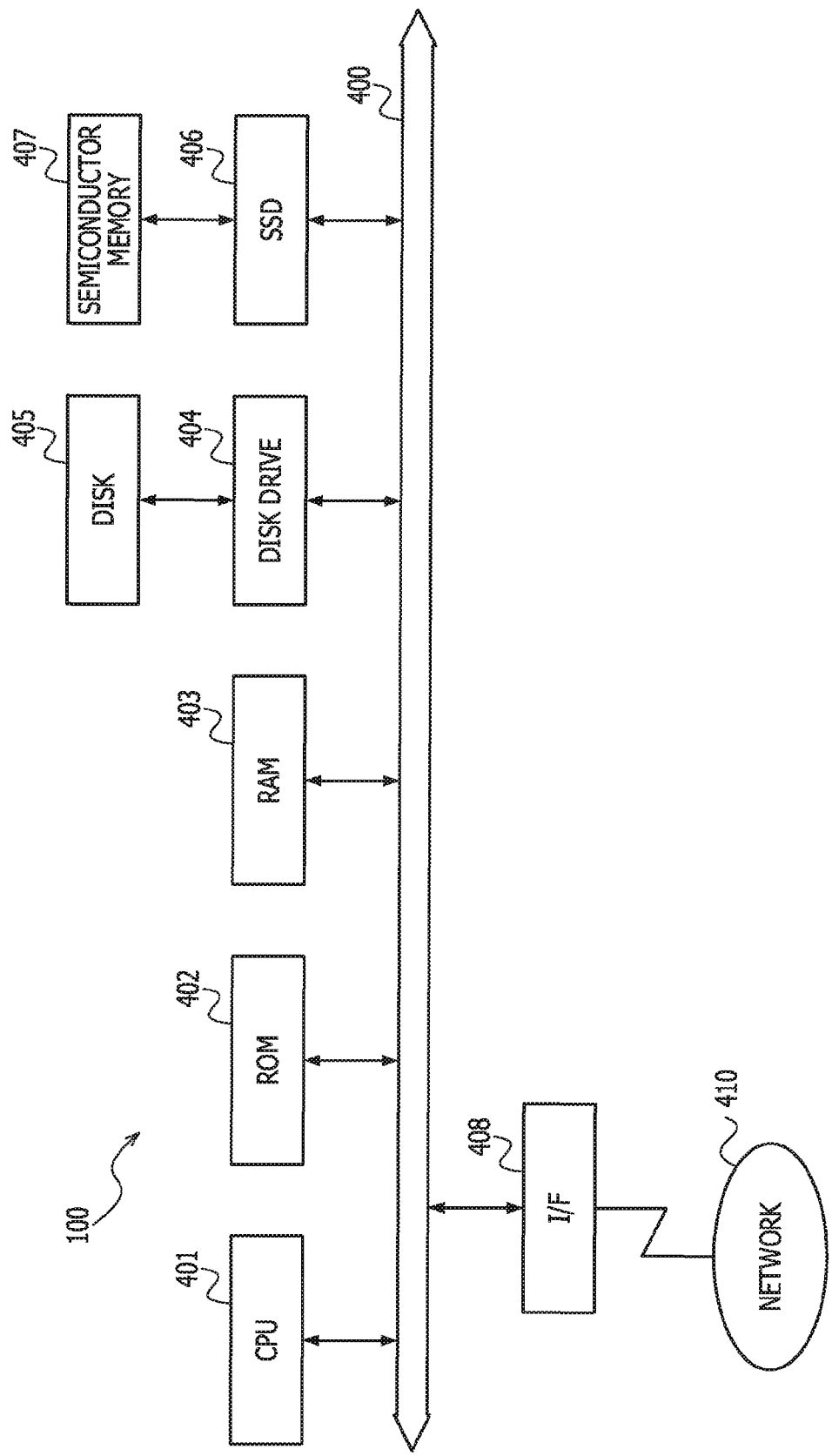
FIG. 4 is a block diagram illustrating an example of hardware of an information recording apparatus.

FIG. 4 is a block diagram illustrating an example of hardware of the information recording apparatus 100. In FIG. 4, the information recording apparatus 100 includes a central processing unit (CPU) 401, a read only memory (ROM) 402, and a random access memory (RAM) 403. In addition, the information recording apparatus 100 further includes a disk drive 404, a disk 405, an SSD 406, a semiconductor memory 407, and an interface (I/F) 408.

In addition, the CPU 401, the ROM 402, the RAM 403, the disk drive 404, the SSD 406, and the I/F 408 are coupled to each other via a bus 400. The information recording apparatus 100 is, for example, a server, a personal computer (PC), a laptop, a tablet PC, or a smart phone.

Here, the CPU 401 controls the entire information recording apparatus 100. The ROM 402 stores various programs including a boot program and the information recording program according to the embodiment. The RAM 403 is used as a work area of the CPU 401. In addition, the RAM 403 stores various kinds of data including data obtained by execution of the various programs.

The disk drive 404 is controlled by the CPU 401 to control reading and writing data from and to the disk 405. The disk 405 stores the data that is written by the control of the disk drive 404. The SSD 406 is controlled by the CPU 401 to control reading and writing data from and to the semiconductor memory 407. The semiconductor memory 407 stores the data that is written by the control of the SSD 406.

The I/F 408 is coupled to a network 410 via a communication line and is coupled to another device via the network 410. The network 410 is, for example, a local area network (LAN), a wide area network (WAN), or the Internet.

In addition, the I/F 408 controls an interface between the network 410 and the inside of the apparatus and controls input and output data from and to an external device. The I/F 408 is, for example, a modem or a LAN adaptor.

The information recording apparatus 100 may include both or one of the disk 405 and the semiconductor memory 407. In addition, the information recording apparatus 100 may include at least one of an optical disc, a display, a keyboard, a mouse, a scanner, and a printer.

Exemplary Functional Configuration of Information Recording Apparatus 100

Next, a description will be given of an exemplary functional configuration of the information recording apparatus 100 with reference to FIG. 5.

Figure 5:
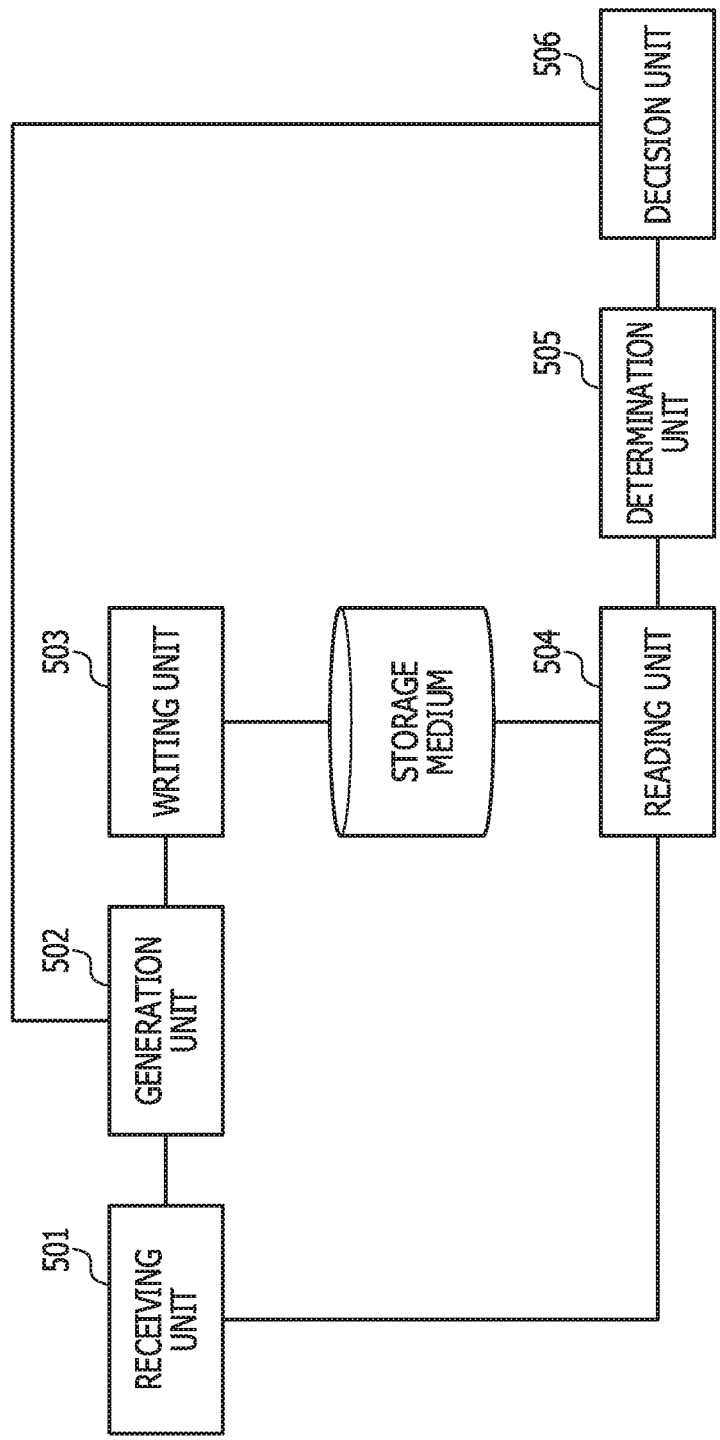
FIG. 5 is a block diagram illustrating an exemplary functional configuration of the information recording apparatus.

FIG. 5 is a block diagram illustrating an exemplary functional configuration of the information recording apparatus 100. The information recording apparatus 100 includes, as functions of a control unit, a receiving unit 501, a generation unit 502, a writing unit 503, a reading unit 504, a determination unit 505, and a decision unit 506.

The information recording apparatus 100 generates writing target data that includes first information and second information when the control unit is made to write the writing target data, which is formed of a plurality of block units in the storage region, in the storage medium, for example, and performs processing of writing the generated writing target data in the storage medium. The storage region is the RAM 403, for example.

Here, the first information is information that indicates a value corresponding to third information, for example. The third information is a value of the termination block of the writing target data, for example. The third information may be information that indicates a value obtained by inverting the first information. In doing so, the information recording apparatus 100 can change a state of the storage medium after writing the writing target data in the storage medium into a state in which the first information and the third information, which coincides with the value indicated by the first information or is obtained by inverting the value indicated by the first information, are stored at different positions in the writing target data in the storage medium.

The second information is information that indicates a value corresponding to fourth information. The fourth information is a value of writing target data following the above writing target data. In doing so, the information recording apparatus 100 can change the state of the storage medium after writing the writing target data in the storage medium into a state in which the second information is stored in the writing target data in the storage medium and the fourth information is stored in the following writing target data in the storage medium. The first information and the second information are stored, for example, in the head block of the writing target data.

The information recording apparatus 100 may further generate writing target data that includes fifth information. The fifth information is information that indicates whether or not the value stored in the first information and the value stored in the third information have changed. In doing so, the information recording apparatus 100 can change the state after writing the writing target data in the storage medium into a state in which it is possible to determine whether or not a combination of the first information and the third information in the writing target data in the storage medium has been changed from an original combination.

Specifically, the information recording apparatus 100 is controlled by the control unit to perform a first operation, a second operation, and a third operation. The first operation is an operation of performing writing processing. The second operation is an operation of specifying a termination position of data writing. The third operation is an operation of reading the data written in the writing processing.

First Operation

First, a description will be given of the first operation. The first operation is an operation of performing writing processing. The first operation is realized by the receiving unit 501, the generation unit 502, and the writing unit 503.

The receiving unit 501 receives target data to be written in the storage medium. The storage medium is a medium, which is divided into storage regions in units of blocks, in which data is written in units of blocks. The storage medium is a medium, the contiguous storage regions of which are handled as a buffer, and the data is sequentially written in the contiguous storage regions in units of blocks. The storage medium is, for example, the disk 405 or the semiconductor memory 407 illustrated in FIG. 4, for example. An example of a data structure in the buffer will be described later with reference to FIG. 6. The size of the target data is variable. The size of the target data may be fixed. The receiving unit 501 receives 1500-byte target data, for example.

In doing so, the receiving unit 501 can output the target data to the generation unit 502 and cause the generation unit 502 to generate the writing target data that includes the target data. The receiving unit 501 realizes the function by the I/F 408 or the CPU 401 executing the program stored in the storage device such as the ROM 402, the RAM 403, the disk 405, or the semiconductor memory 407 illustrated in FIG. 4, for example. The received target data is stored in a storage region of the RAM 403, the disk 405, or the semiconductor memory 407, for example.

The generation unit 502 generates writing target data, which corresponds to the first number of blocks and includes the first information, the second information, and the target data, when the target data received by the receiving unit 501 is written in the storage medium. The first number of blocks are a positive number of blocks, and are a number of blocks in which at least the first information, the second information, and the target data can be written.

The first information is information that indicates at least an arbitrary value of the termination block in the first number of blocks from the writing start position in the storage medium. The first information is information that indicates a value at a first position in the termination block in the first number of blocks from the writing start position, for example. The first position is a termination position of the block, for example. The writing start position is a head position of an arbitrary unwritten block. The writing start position is a position at which the head part of the writing target data is written, for example. The first number of blocks correspond to the storage region as the writing destination of the current writing target data in the current writing processing. In the following description, the first number of blocks will also be described as a "writing destination region".

The second information is at least an arbitrary value of the block, which follows the termination block in the writing destination region with the second number of blocks interposed therebetween. The second number of blocks is a predetermined positive number of blocks, and the second number is equal to or less than the lower limit of the first number. The second information is a value at a second position on the block, which follows the termination block in the writing destination region with the second number of blocks interposed therebetween, for example. The second position is a head position of the block, for example. The block, which follows the termination block in the writing destination region with the second number of blocks interposed therebetween, is a block in a storage region that is scheduled to be a writing destination of the next writing target data in the next writing processing performed. In the following description, the block, which follows the termination block in the writing destination region with the second number of blocks interposed therebetween, will also be described as a "writing scheduled block".

The generation unit 502 specifies the number "3" of blocks in which 1-bit header information including the first information and the second information and the 1500-byte target data can be written, for example. Next, the generation unit 502 reads, as the first information, a 1-bit value at the termination position of the termination block in the writing destination region that corresponds to three blocks from the writing start position. In addition, the generation unit 502 reads, as the second information, a 1-bit value at the head position of the writing scheduled block, which follows the termination block in the writing destination region with one block interposed therebetween. Then, the generation unit 502 generates writing target data in the three blocks, which includes the 1-bit header information including the first information and the second information and the 1500-byte target data. One example of a data structure in the writing target data will be described later with reference to FIG. 7.

In doing so, the generation unit 502 can hold the value of the termination block in the writing destination region of the current writing target data in a state before writing the current writing target data as the first information in the writing target data. Then, it is possible to guarantee that the writing of the current writing target data has been completed if the first information does not coincide with the value of the termination block in the writing destination region. Similarly, the generation unit 502 can hold the value of the writing scheduled block of the next writing target data in a state before writing the next writing target data as the second information in the writing target data. Then, it is possible to guarantee that the writing of the next writing target data has been started and that the writing of the data corresponding to the second number of blocks from the head of the next writing target data has been completed if the second information does not coincide with the value of the writing scheduled block.

In addition, the generation unit 502 may further generate writing target data that includes the third information. The third information is information which is included in the writing target data as a value to be written at the first position in the termination block in the writing destination region and indicates a value that is different from the value indicated by the first information. The generation unit 502 generates, as the third information, a value obtained by inverting the value indicated by the first information, for example. Then, the generation unit 502 generates writing target data, which includes the header information including the first information and the second information, the target data, and the third information as a value to be written at the termination position of the termination block in the writing destination region. In doing so, the generation unit 502 can fix a change in a state in relation to whether or not the first information and the value of the termination block 113 coincide with each other such that the value of the termination block 113 of the writing destination region 112 changes every time the current writing target data has successfully been written.

In addition, the generation unit 502 may further generate writing target data that includes the fourth information. The fourth information is information which is included in the writing target data as a value to be written at the second position in the block, which follows the block immediately before the writing start position with the second number of blocks interposed therebetween, and indicates a value that is different from the value at the second position in the block, which follows the block immediately before the writing start position with the second number of blocks interposed therebetween. In the following description, the block immediately before the writing start position will also be described as a "previous block". The generation unit 502 generates, as the fourth information, a value obtained by inverting the value at the head position of the block, which follows the previous block with one block interposed therebetween, for example. Then, the generation unit 502 generates writing target data that includes header information including the first information, the second information, and the fourth information and the target data. In doing so, the generation unit 502 can obtain a state in which the value of the writing scheduled block 114 of the next writing target data changes every time the writing of the next writing target data is started. Therefore, the generation unit 502 can fix a change in a state in relation to whether or not the second information and the value of the writing scheduled block 114 coincide with each other if the writing of the next writing target data is started.

In addition, the generation unit 502 may further generate writing target data that includes the fifth information by using the value of the target data as the third information. The fifth information is information that indicates whether or not the value of the target data has been changed in order to use the value of the data as the third information. The fifth information is information for restoring a value of the target data after the change to a value before the change. The fifth information is 1-bit information that indicates that inversion has been made in a case in which an arbitrary value of the target data is inverted and used as the third information, for example. The fifth information may be the value itself before the change, for example. The generation unit 502 determines whether or not the value at the first position in the termination block in the writing destination region coincides with the value, which is to be written at the first position in the termination block in the writing destination region, in the target data, for example. If the values do not coincide with each other, it is possible to use the value, which is to be written at the first position in the termination block in the writing destination region, in the target data as the third information without any change. Therefore, the generation unit 502 generates the fifth information that indicates that the value of the target data has not been changed, without changing the target data. Then, the generation unit 502 generates writing target data that includes header information including the first information, the second information, and the fifth information and the target data that has not been changed.

In contrast, if the values coincide with each other, usage of the value, which is to be written at the first position in the termination block in the writing destination region, in the target data as the third information is not available for the generation unit 502. Therefore, the value is changed to a different value. Furthermore, the generation unit 502 generates the fifth information that indicates that the value of the target data has been changed. Then, the generation unit 502 generates writing target data that includes the header information which includes the first information, the second information, and the fifth information and the target data after the change of the value, which is to be written at the first position in the termination block in the writing destination region, to the different value. In doing so, the generation unit 502 can use the value of the target data as the third information and can hold the fifth information, which indicates that the target data has been changed, in the writing target data such that when the value of the target data is changed, the value can be restored when the target data is read.

In addition, the generation unit 502 may generate writing target data that includes the first information and the second information as information to be written at a block, which follows the previous block with the second number of blocks interposed therebetween. The generation unit 502 generates the header information including the first information and the second information and then generates writing target data that includes the header information as information to be written in the block, which follows the previous block with the second number of blocks interposed therebetween. In doing so, if there is previous writing target data, the generation unit 502 can cause the first information and the second information to be included in data within a range, in which it is possible to guarantee that the writing is successfully performed, in the current writing target data based on the second information of the previous writing target data. As a result, the generation unit 502 can avoid a state, in which specification of the termination position of the data writing is not available, which is caused because the first information and the second information are not written.

In addition, the generation unit 502 may set "1" as the second number. In other words, the generation unit 502 generates writing target data that includes the first information and the second information as information to be written in the block, which follows the previous block with one block interposed therebetween. The generation unit 502 generates the header information including the first information and the second information, for example, and then generates writing target data that includes the header information as information to be written in the head block in the first number of blocks from the writing start position. In doing so, if there is previous writing target data, the generation unit 502 can cause the first information and the second information to be included in the data within a range, in which it is possible to guarantee that the writing is successfully performed, in the current writing target data based on the second information of the previous writing target data.

The generation unit 502 realizes the function by causing the CPU 401 to execute the program that is stored in the storage device such as the ROM 402, the RAM 403, the disk 405, or the semiconductor memory 407 illustrated in FIG. 4, for example. The generated writing target data is stored in the storage region of the RAM 403, the disk 405, or the semiconductor memory 407.

The writing unit 503 writes the writing target data, which is generated by the generation unit 502, from the writing start position. The writing unit 503 divides the writing target data into first data that includes data to be written in a block, which follows the previous block with the second number of blocks interposed therebetween and second data that includes data to be written in the termination block in the writing destination region. The writing unit 503 writes the second data after completion of the writing of the first data. In doing so, the writing unit 503 can achieve a state in which it is possible to determine whether or not writing of the current writing target data has been completed based on the first information and the second information even in a case in which the storage device does not write the writing target data in the storage medium in an order from the head thereof.

In addition, the writing unit 503 can achieve a state in which it is possible to determine whether or not writing of the next writing target data has been started even in the case in which the storage device does not write the writing target data in the storage medium in the order from the head thereof.

The writing unit 503 records, in a non-volatile storage medium that is different from the storage medium, information that indicates the termination position of the storage region after completion of the writing in the contiguous storage regions when the writing of the writing target data is completed. The termination position of the storage region after completion of the writing in the contiguous storage regions is the termination position of the data writing. In doing so, the writing unit 503 does not have to specify the termination position of the data writing by using the first information and the second information and can reduce processing load.

The writing unit 503 records information, which indicates the termination position of the storage region where writing has been completed immediately before receiving a request for stopping power supply, in a storage region that is different from the contiguous storage regions. The termination position of the storage region where the writing has been completed immediately before the reception is a termination position of the data writing. In doing so, the writing unit 503 does not have to specify the termination position of the data writing by using the first information and the second information when the power is supplied next time, and can reduce processing load.

The writing unit 503 realizes the function by causing the CPU 401 to execute the program stored in the storage device such as the ROM 402, the RAM 403, the disk 405, or the semiconductor memory 407 illustrated in FIG. 4, for example.

Second Operation

Next, a description will be given of the second operation. The second operation is an operation of specifying the termination position of the data writing. The second operation is realized by the receiving unit 501, the reading unit 504, the determination unit 505, and the decision unit 506.

The reading unit 504 reads the first information and the second information. The reading unit 504 reads the first information and the second information written as arbitrary writing target data if writing has already performed in a block, which follows the block immediately before the writing start position of the arbitrary writing target data with the second number of blocks interposed therebetween.

Specifically, the reading unit 504 reads information recorded in another storage region when the reading unit 504 recovers from the state in which the power supply is stopped. If the read information indicates that the writing has already been performed in the block, which follows the block immediately before the writing start position of the arbitrary writing target data with the second number of blocks interposed therebetween, the reading unit 504 reads the first information and the second information written as the arbitrary writing target data. In doing so, the reading unit 504 can read information for specifying the termination position of the data writing.

If the determination unit 505 determines that writing of the next writing target data after the arbitrary writing target data has been started as will be described later, the reading unit 504 reads the first information and the second information written as the next writing target data. In doing so, the reading unit 504 can read the information for specifying the termination position of the data writing. In the following description, the writing target data from which the first information and the second information are read will also be referred to as "writing target data from a reading source".

The reading unit 504 realizes the function by the CPU 401 executing the program stored in the storage device such as the ROM 402, the RAM 403, the disk 405, or the semiconductor memory 407 illustrated in FIG. 4, for example. The read data is stored in the storage region of the RAM 403, the disk 405, or the semiconductor memory 407, for example.

The determination unit 505 determines whether or not writing has already been performed in the termination block of the writing destination region based on the value indicated by the first information. The determination unit 505 determines whether a value of the termination block in the writing destination region of the writing target data from the reading source coincides with the value indicated by the first information since the value of the termination block is in a state before the third information is written, for example. In addition, the determination unit 505 determines whether the value of the termination block in the writing destination region of the writing target data from the reading source does not coincide with the value indicated by the first information since the value of the termination block is in a state after the third information is written. Here, if the value of the termination block is determined to coincide with the value indicated by the first information, the determination unit 505 determines that writing has not been performed in the termination block in the writing destination region of the writing target data from the reading source. In contrast, if the value of the termination block is determined not to coincide with the value indicated by the first information, the determination unit 505 determines that writing has been performed in the termination block in the writing determination region of the writing target data from the reading source. In doing so, the determination unit 505 can determine whether or not the writing of the writing target data from the reading source has been completed.

The determination unit 505 determines whether or not the writing has been performed in the writing scheduled block of the next writing target data in the writing target data from the reading source based on the value indicated by the second information. The determination unit 505 determines whether the value of the writing scheduled block coincides with the value indicated by the second information since the value of the writing scheduled block is in a state before the fourth information is written, or determines whether the value of the writing scheduled block does not coincide with the value indicated by the second information since the value of the writing scheduled block is in a state before the fourth information is written. Here, if the value of the writing scheduled block is determined to coincide with the value indicated by the second information, the determination unit 505 determines that the writing has not been performed in the writing scheduled block. In contrast, if the value of the writing scheduled block is determined not to coincide with the value indicated by the second information, the determination unit 505 determines that the writing has been performed in the writing scheduled block. In doing so, the determination unit 505 can determine whether or not the writing of the next writing target data in the writing target data from a reading source has been started.

The determination unit 505 realizes the function by the CPU 401 executing the program stored in the storage device such as the ROM 402, the RAM 403, the disk 405, or the semiconductor memory 407 illustrated in FIG. 4, for example. The determination result is stored in the storage region of the RAM 403, the disk 405, or the semiconductor memory 407, for example.

The decision unit 506 decides the termination position of the data writing in the contiguous storage regions based on the read first information and the second information. The termination of the data writing corresponds to the termination block in the storage region in which writing of the writing target data has been completed, for example. For example, there is a case where the determination unit 505 determines that the writing has not been performed in the writing scheduled block and that the writing has been performed in the termination block in the writing destination region. In such a case, the decision unit 506 decides the termination block in the writing destination region as the termination position of the data writing. In doing so, the decision unit 506 can specify that the writing of the next writing target data in the writing target data from the reading source has been completed and that the writing of the next writing target data in the writing target data has not been started or has been failed and specify the termination position of the data writing. Then, the decision unit 506 can specify a range of the storage region where the writing target data has already been written based on the termination position of the data writing and read the writing target data.

In contrast, there is also a case in which the determination unit 505 determines that the writing has not been performed in the writing scheduled block and that the writing has not been performed in the termination block in the writing destination region, for example. In such a case, the decision unit 506 decides the block immediately before the writing destination region as the termination position of the data writing. In doing so, the decision unit 506 can specify that the writing of the next writing target data in the writing target data from the reading source has been failed and decide the termination position of the data writing. Then, the decision unit 506 can specify the range of the storage region where the writing target data has already been written based on the termination position of the data writing and read the writing target data.

The decision unit 506 may decide a writing start position of writing target data, which includes new data, in the storage medium based on the read first information and the second information. For example, there is case in which the determination unit 505 determines that the writing has not been performed in the writing scheduled block and that the writing has been performed in the termination block in the writing destination region. In such a case, the decision unit 506 decides the head position of the block following the termination block in the writing destination region as the writing start position of the new writing target data. In doing so, the decision unit 506 can specify that the writing of the next writing target data in the writing target data from the reading source has been completed and the writing of the next writing target data in the writing target data has not been started or has been failed and decide the newest writing start position.

In contrast, there is a case where the determination unit 505 determines that the writing has not been performed in the writing scheduled block and that the writing has not been performed in the termination block in the writing destination region, for example. In such a case, the decision unit 506 decides the writing start position of the next writing target data in the writing target data from the reading source as a writing start position of the writing target data that includes the new data. In doing so, the decision unit 506 can specify that the writing of the next writing target data in the writing target data from the reading source has been failed and decide the newest writing start position.

The decision unit 506 realizes the function by the CPU 401 executing the program stored in the storage device such as the ROM 402, the RAM 403, the disk 405, or the semiconductor memory 407 illustrated in FIG. 4, for example.

Third Operation

Next, a description will be given of the third operation. The third operation is an operation of reading writing target data that has been written in the writing processing. The third operation is realized by the receiving unit 501 and the reading unit 504.

The receiving unit 501 receives a request for reading target data. The receiving unit 501 receives a request for reading target data that is included in writing target data, for example. In doing so, the receiving unit 501 can cause the reading unit 504 to read the target data.

If the receiving unit 501 receives the request for reading the target data, the reading unit 504 reads the writing target data written in the storage medium. The reading unit 504 reads the writing target data written up to the termination position of the data writing, which has been decided by the decision unit 506, in the ring buffer, for example.

Next, the reading unit 504 extracts the fifth information that is included in the writing target data and extracts the target data that is included in the writing target data. Here, when the fifth data indicates that the value, which is written at the first position in the termination block in the writing destination region, in the target data has been changed, the reading unit 504 inverts the value, which is read from the first position in the termination block in the writing destination region, in the target data and restores a value before the change. In contrast, when the fifth information indicates that the value, which is written at the first position in the termination block in the writing destination region, in the target data has not been changed, the reading unit 504 does not change the target data. In doing so, the reading unit 504 can read arbitrary writing target data and obtain the target data that is included in the writing target data. In addition, the reading unit 504 can restore the target data even if the value of the target data has been changed.

One Example of Data Structure in Storage Region 600 on Storage Medium

Next, a description will be given of an example of a data structure in a storage region 600 on the storage medium such as the disk 405 or the semiconductor memory 407 illustrated in FIG. 4 with reference to FIG. 6.

Figure 6:
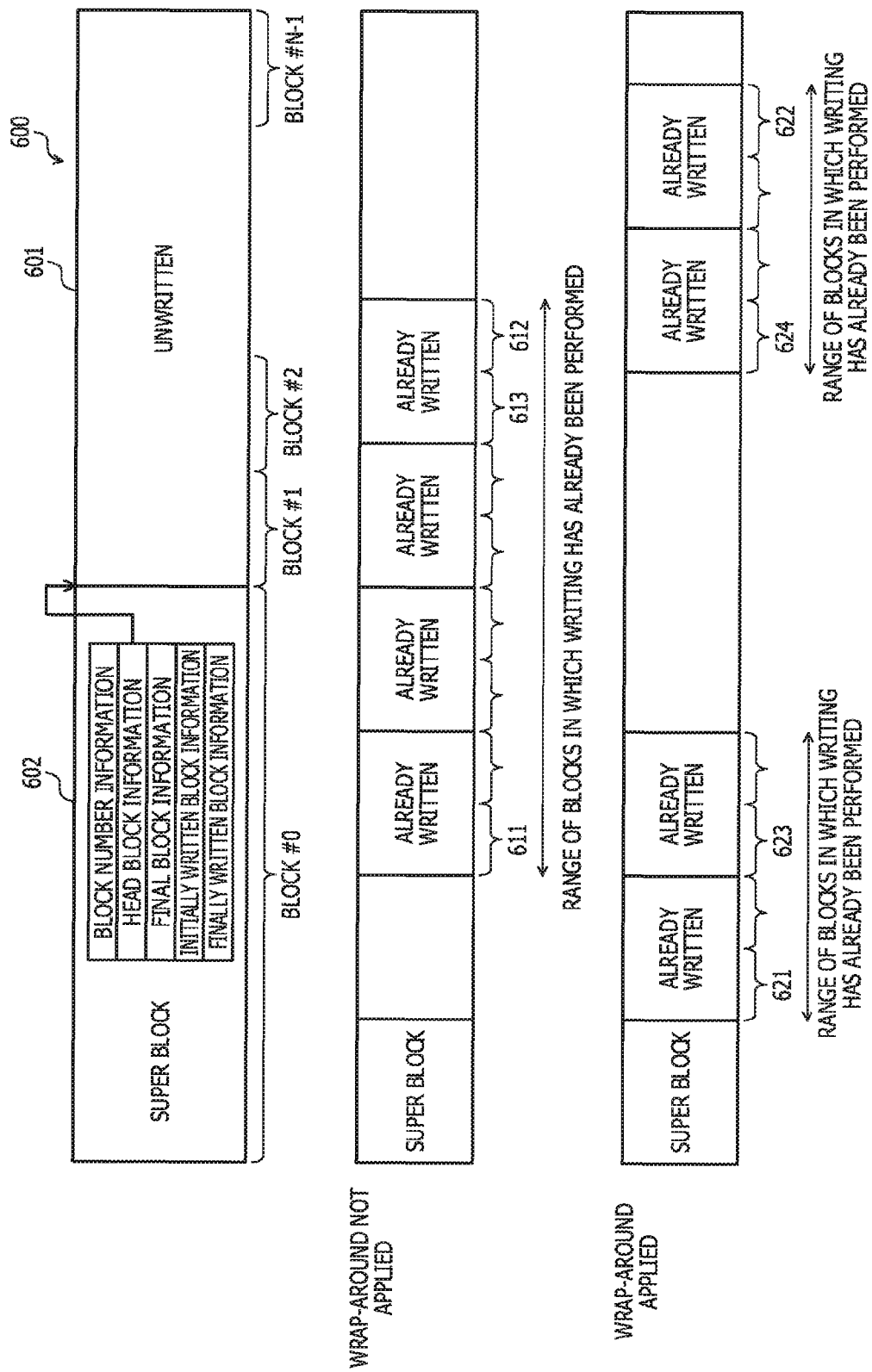
FIG. 6 is an explanatory diagram illustrating an example of a data structure in a storage region on a recording medium.

FIG. 6 is an explanatory diagram illustrating an example of a data structure in the storage region 600 on the storage medium. The storage region 600 on the storage medium includes contiguous storage regions that are handled as a buffer 601 and a super block 602. The storage region 600 includes N blocks. In the following description, the blocks will also be referred to as a block #0, a block #1, . . . and a block #N−1 in an order from the head block in the storage region 600.

The buffer 601 is configured of logically contiguous storage regions. The buffer 601 is configured of storage regions from the block #1 to the block #N−1. The buffer 601 may be storage regions, to which a wrap-around scheme, for example, is applied, which is set such that the block following the termination block becomes the head block. The buffer 601 to which the wrap-around scheme is applied is also referred to as a ring buffer, for example.

The super block 602 is a storage region that stores information related to the buffer 601, which includes information about a termination position of data writing on the buffer 601 and enables to specify a writing start position when writing processing for new writing target data is performed. The super block 602 is a block #0, for example. The super block 602 is a storage region where management information is stored, for example.

The management information includes block number information, head block information, final block information, and initially written block information, and finally written block information. The block number information is information that indicates the number of blocks included in the buffer 601. The block number information is the number "N" of blocks, for example.

The head block information is information for identifying the head block of the buffer 601. The head block information is a block number that is allocated to the head block of the buffer 601. The head block information is identification information "1" of the block #1, for example. The final block information is information for identifying the final block at the final position in the blocks, in which writing has already been performed, in the buffer 601. The final block information is a block number that is allocated to the final block among the blocks, in which writing has already been performed, in the buffer 601. The final block information is an initial value "0" before the writing in the buffer 601 is performed, for example.

The initially written block information is information for identifying an initially written block, in which a head part of the writing target data to be written first is written, in the blocks, in which writing has already been performed, in the buffer 601. The initially written block information is a block number that is allocated to the initially written block in the buffer 601. The initially written block information is an initial value "0" before the writing in the buffer 601 is performed, for example. The finally written block information is information for identifying a finally written block, in which a head part of the writing target data to be written at the end, in the blocks, in which writing has already been performed, in the buffer 601. The finally written block information is a block number that is allocated to the finally written block in the buffer 601. The finally written block information is an initial value "0" before the writing in the buffer 601 is performed, for example.

Here, a description will be given of a specific example of a data structure in the storage region 600 on the storage medium in a case of not applying the wrap-around scheme. In such a case, data may be sequentially written from the head block that is indicated by the head block information, or the data may be sequentially written from an arbitrary block. The information recording apparatus 100 writes data in the arbitrary block first, for example, and then sets identification information of the arbitrary block. The information recording apparatus 100 sets identification information of the final block, in which a termination part of the writing target data to be written at the final position is written, as the final block information every time the writing target data is written. In addition, the information recording apparatus 100 sets identification information of the finally written block, in which the head part of the writing target data to be written at the end is written, as the finally written block information every time the writing target data is written. In the example illustrated in FIG. 6, identification information of a block 611 is set as the head block information. In addition, identification information of a block 612 is set as the final block information. Moreover, identification information of the block 611 is set as the initially written block information. Furthermore, identification information of a block 613 is set as the finally written block information.

In doing so, the information recording apparatus 100 can specify the range of the storage region, in which the writing has already been performed, in the buffer 601 and specify the termination position of the data. The information recording apparatus 100 can specify that the block that is identified by the initially written block information is the head block of the blocks in which the writing has already been performed, for example. In addition, the information recording apparatus 100 can specify that the block that is identified by the final block information is the termination block in the storage region in which the writing has already been performed. In other words, the information recording apparatus 100 can specify, as the range of the storage region, in which the writing has already been performed, a range from the block that is identified by the initially written block information to the block that is identified by the final block information. The information recording apparatus 100 can read the writing target data written in the specified range of the storage region in which the writing has already been performed.

In addition, a description will be given of a specific example of a data structure in the storage region 600 on the storage medium in a case of applying the wrap-around scheme. In such a case, data may be sequentially written from the head block that is indicated by the head block information, or may be sequentially written from an arbitrary block. The information recording apparatus 100 writes the data in the arbitrary block and then sets identification information of the arbitrary block as the initially written block information. The information recording apparatus 100 sets identification information of the final block, in which the termination portion of the writing target data to be written at the end is written, as the final block information every time the writing target data is written. In addition, the information recording apparatus 100 sets identification information of the finally written block, in which the head part of the writing target data to be written at the end is written, as the finally written block information every time the writing target data is written. In the example illustrated in FIG. 6, identification information of a block 621 is set as the head block information. In addition, identification information of a block 622 is set as the final block information. Moreover, identification information of a block 624 is set as the initially written block information. Furthermore, identification information of a block 623 is set as the finally written block information.

In doing so, the information recording apparatus 100 can specify the range of the storage region, in which the writing has already been performed, in the buffer 601 and specify the termination position of the data. The information recording apparatus 100 can specify that the block that is identified by the initially written block information is the head block of the blocks in which the writing has already been performed. In addition, the information recording apparatus 100 can specify that the termination block in the writing destination region, which includes the block identified by the finally written block information as the head block, is the termination block of the storage region in which the writing has already been performed. In other words, the information recording apparatus 100 can specify, as the range of the storage region in which the writing has already been performed, the range from the block that is identified by the initially written block information to the termination block in the writing destination region that includes, as the head block, the block identified by the finally written block information. In addition, there is a case where the block that is identified by the initially written block information appears after the block that is identified by the finally written block information. In such a case, the information recording apparatus 100 can specify that the range of the storage region in which the writing has already been performed is a range of storage regions that logically continue to return to the block that is identified by the head block information from the block that is identified by the final block information. The information recording apparatus 100 can read the writing target data written in the specified range of the storage region in which the writing has already been performed. In the following description, the buffer 601 is assumed to be a ring buffer to which the wrap-around scheme is applied.

One Example of Data Structure in Writing Target Data 700

Next, a description will be given of an example of a data structure in writing target data 700 with reference to FIG. 7.

Figure 7:
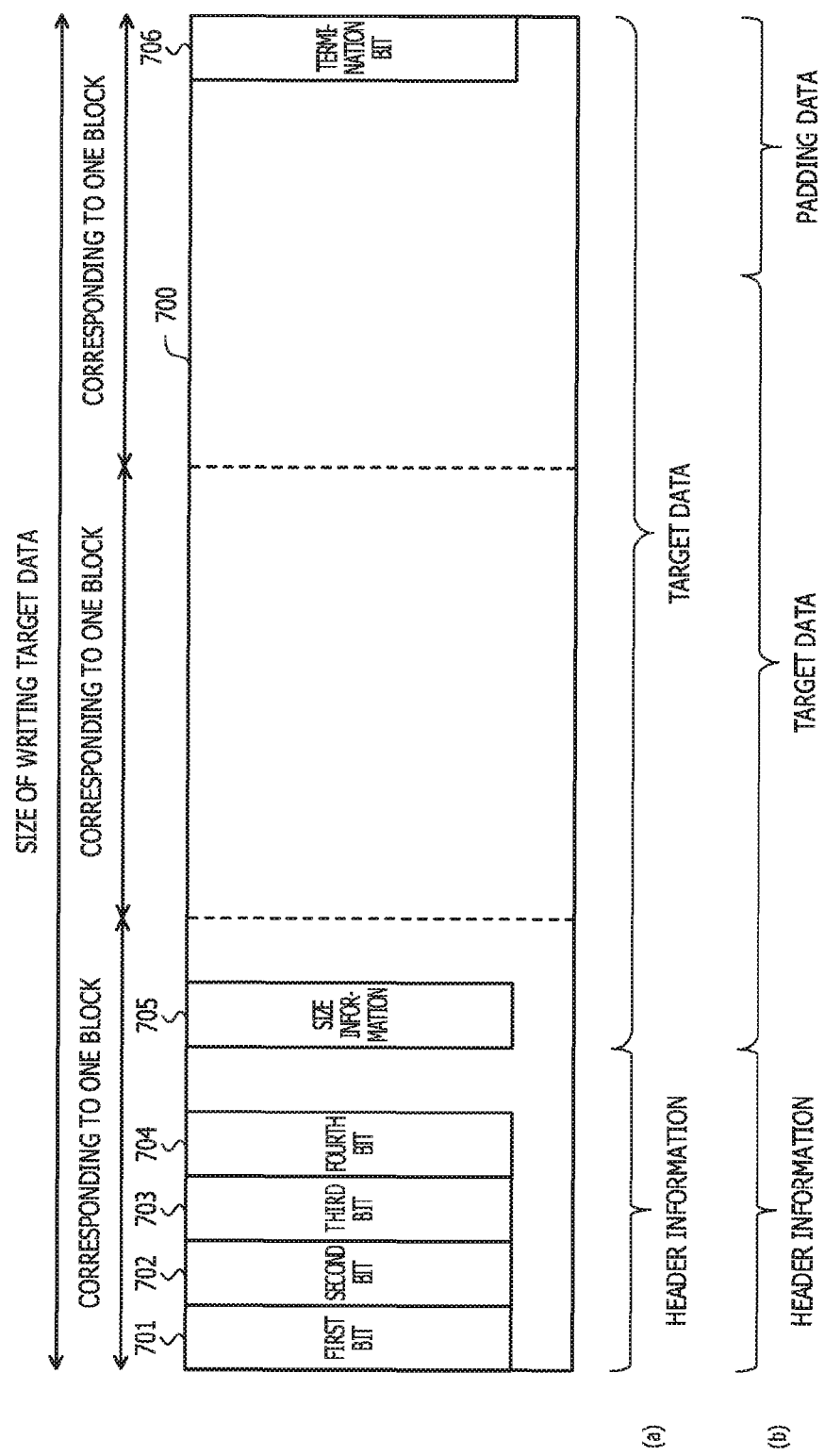
FIG. 7 is an explanatory diagram illustrating an example of a data structure of written data.

FIG. 7 is an explanatory diagram illustrating an example of a data structure in the writing target data 700. The writing target data 700 is data which includes 1-byte header information and target data and corresponds to a predetermined number of blocks. In other words, the writing target data 700 is data with a multiple length of 512 bytes in a case in which one block is a 512-byte storage region.

The header information includes a first bit 701, a second bit 702, a third bit 703, and a fourth bit 704. The first bit 701 is a value obtained by inverting a value at a position where the first bit 701 is to be written on the storage region, in which the writing target data 700 is to be written, which corresponds to one or more blocks. In the following description, the storage region in which the writing target data 700 is written will also be referred to as a "writing destination region".

The second bit 702 is a value at a head position of a block following the writing destination region in which the writing target data 700 is written. The third bit 703 is a value at a termination position on the writing destination region in which the writing target data 700 is written. The fourth bit 704 is a bit that indicates whether or not the value at the termination of the target data has been inverted. In the following description, the value of the termination of the target data will also be referred to as a "termination bit 706". The target data includes size information 705 that indicates the size of the target data.

The writing target data 700 is data that is obtained by combining header information and the target data as illustrated as (a) in FIG. 7, for example. However, there is a case where a sum of the data size of the header information and the size of the target data is not equal to the length corresponding to the predetermined number of blocks in practice. Therefore, the writing target data 700 may be data obtained by combining the header information, the target data, and padding data for adjusting the size of the writing target data 700 as illustrated as (b) in FIG. 7, for example. The padding data is data for adjusting the size of the writing target data 700 and setting the size of the writing target data 700 to be a multiple size of the blocks. The padding data can be removed from the writing target data 700 based on the size information 705 that indicates the size of the target data, for example. The padding data may include information that indicates the size of the padding data so as to be able to remove the padding data when the writing target data 700 is read, for example.

One Example of Generating Writing Target Data 700

Next, a description will be given of an example in which the information recording apparatus 100 generates the writing target data 700 with reference to FIG. 8.

Figure 8:
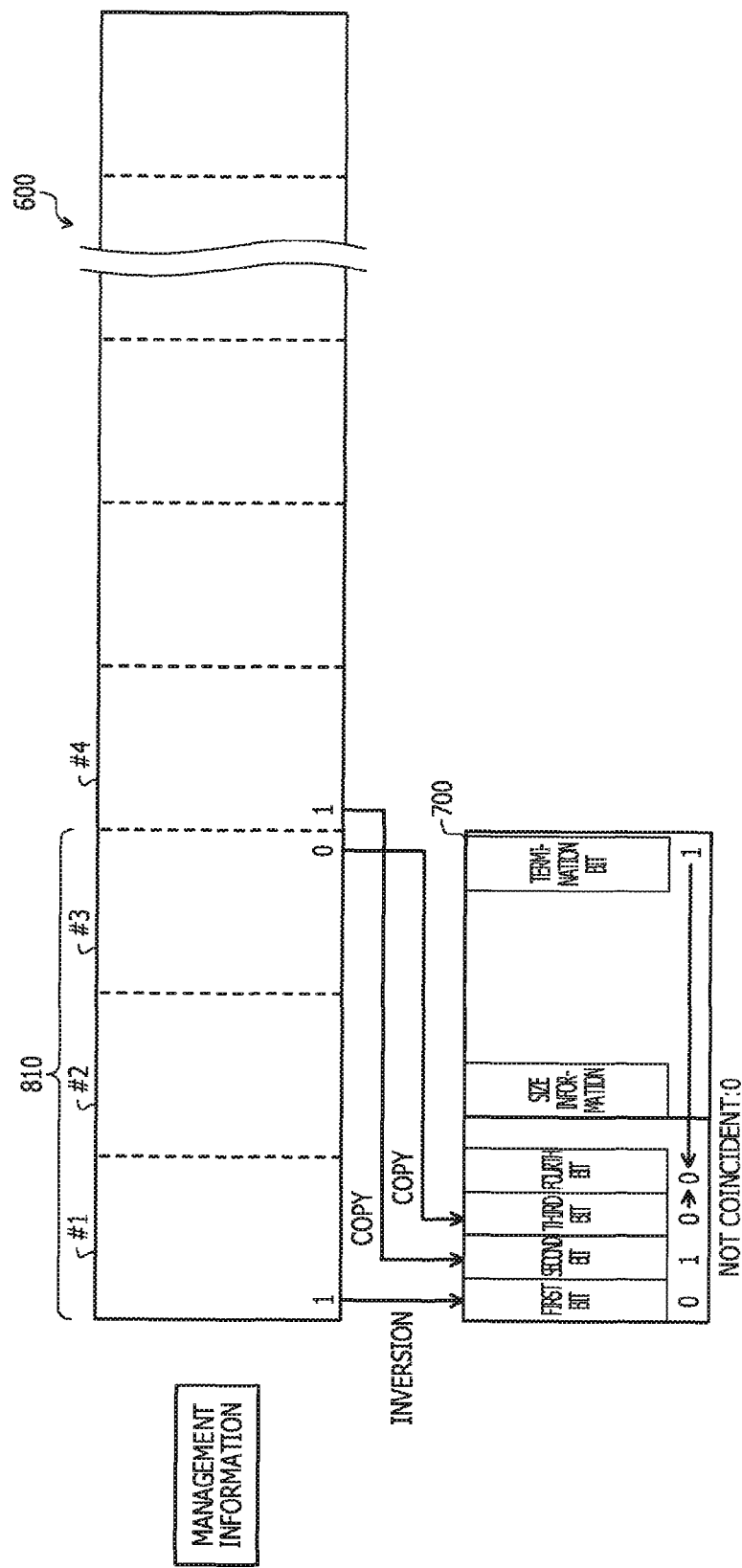
FIG. 8 is an explanatory diagram illustrating an example in which the written data is generated.

FIG. 8 is an explanatory diagram illustrating an example of generating the writing target data 700. In FIG. 8, an example of generating the writing target data 700 that includes the header information at the head and includes the target data at the termination will be described by exemplifying a case in which the information recording apparatus 100 does not invert the termination bit 706 of the writing target data 700.

The information recording apparatus 100 specifies the writing destination region 810, in which the writing target data 700 is written, in the ring buffer 601. In the example illustrated in FIG. 8, the information recording apparatus 100 specifies a storage region corresponding to three blocks #1 to #3 as the writing destination region 810 in which the writing target data 700 is written.

Next, the information recording apparatus 100 reads a value "1" at the head position on the writing destination region 810. Then, the information recording apparatus 100 generates a value "0" as the first bit 701 by inverting the read value "1". The first bit 701 is information for determining whether or not the writing of the writing target data 700 has been started. In addition, the information recording apparatus 100 reads a value "1" at the head position on the block #4 following the writing destination region 810 as the second bit 702. The second bit 702 corresponds to the second information 132 illustrated in FIG. 1. The second bit 702 is information for determining whether or not the writing of the next writing target data 700 has been started.

In addition, the information recording apparatus 100 reads a value "0" at a termination position on the writing destination region 810 as the third bit 703. The third bit 703 corresponds to the first information 131 illustrated in FIG. 1. The third bit 703 is information for determining whether or not the writing of the writing target data 700 has been completed. In addition, the information recording apparatus 100 generates a value "0" as the fourth bit 704 without changing the target data since the third bit 703 "0" does not coincide with the value "1" at the termination of the target data, which corresponds to the termination bit 706 of the writing target data 700. The fourth bit 704 is information for restoring the target data before change from the read target data after change in a case of changing the value at the termination of the target data.

Next, the information recording apparatus 100 generates the 1-byte header information that includes the first bit 701, the second bit 702, the third bit 703, and the fourth bit 704 in this order from the head. 4 bits following the header information is dummy data. Then, the information recording apparatus 100 generates the writing target data 700 that includes the header information t the head and includes the target data at the termination. The fourth bit 704 corresponds to the third information.

In addition, the information recording apparatus 100 may generate the writing target data 700 that includes the header information and the target data from the head and includes the padding data at the termination. In such a case, the information recording apparatus 100 does not have to generate the fourth bit 704 in order to restore the padding data before change since the padding data is removed when the writing target data 700 is read even though a value at a termination of the padding data is changed in some cases.

Another Example of Generating Writing Target Data 700

Next, a description will be given of another example in which the information recording apparatus 100 generates the writing target data 700 with reference to FIG. 9.

FIG. 9 is an explanatory diagram illustrating another example of generating the writing target data 700. In FIG. 9, an example of generating the writing target data 700 that includes the header information at the head and includes the target data at the termination will be described by exemplifying a case in which the information recording apparatus 100 inverts the termination bit 706 of the writing target data 700.

The information recording apparatus 100 specifies a writing destination region 910, in which the writing target data 700 is written, in the ring buffer 601. In the example illustrated in FIG. 9, the information recording apparatus 100 specifies a storage region that corresponds to three blocks #1 to #3 as the writing destination region 910 in which the writing target data 700 is written.

Next, the information recording apparatus 100 reads a value "1" at the head position on the writing destination region 910. Then, the information recording apparatus 100 generates a value "0" as the first bit 701 by inverting the read value "1". In addition, the information recording apparatus 100 reads a value "1" at a head position on the block #4 following the writing destination region 910 as the second bit 702.

In addition, the information recording apparatus 100 reads a value "1" at a termination position on the writing destination region 910 as the third bit 703. Moreover, the information recording apparatus 100 changes the termination bit 706 "1" of the target data to the inverted value "0" and generates a value "1" as the fourth bit 704 since the third bit 703 "1" coincides with the termination bit 706 "1" of the target data.

Next, the information recording apparatus 100 generates the 1-byte header information that includes the first bit 701, the second bit 702, the third bit 703, and the fourth bit 704 in this order from the head. 4 bits following the header information is dummy data. Then, the information recording apparatus 100 generates the writing target data 700 that includes the header information at the head and includes the target data at the termination.

In addition, the information recording apparatus 100 may generate the writing target data 700 that includes the header information and the target data from the head and includes the padding data at the termination. In such a case, the information recording apparatus 100 does not have to generate the fourth bit 704 in order to restore the padding data before change since the padding data is removed when the writing target data 700 is read even though a value at a termination of the padding data is changed in some cases.

One Example in which Writing Target Data 1010 and 1210 is Written

Next, a description will be given of an example in which the information recording apparatus 100 writes writing target data 1010 and 1210 with reference to FIGS. 10, 11, 12, and 13.

FIGS. 10, 11, 12, and 13 are explanatory diagrams illustrating an example in which writing target data 1010 and 1210 is written. In FIG. 10A, 10B, the information recording apparatus 100 receives first target data to be written in the storage medium and then specifies a head position of the head block #1 in the ring buffer 601 illustrated in FIG. 6 as a writing start position with reference to management information.

Next, the information recording apparatus 100 specifies a data length corresponding to three blocks as the size of the first writing target data 1010 that includes the first target data based on the size of the first target data. The information recording apparatus 100 specifies the storage regions #1 to #3 corresponding to three blocks from the writing start position as a first writing destination region 1001 in which the first writing target data 1010 is written. Then, the information recording apparatus 100 generates the first writing target data 1010 that includes the first target data and corresponds to the three blocks, and writes the first writing target data 1010 in units of blocks in the first writing destination region 1001. The states illustrated as (A), (B), and (C) in FIG. 10A, 10B are states of the ring buffer 601 when the first writing target data 1010 is written in units of blocks in the first writing destination region 1001.

Figure 10A:
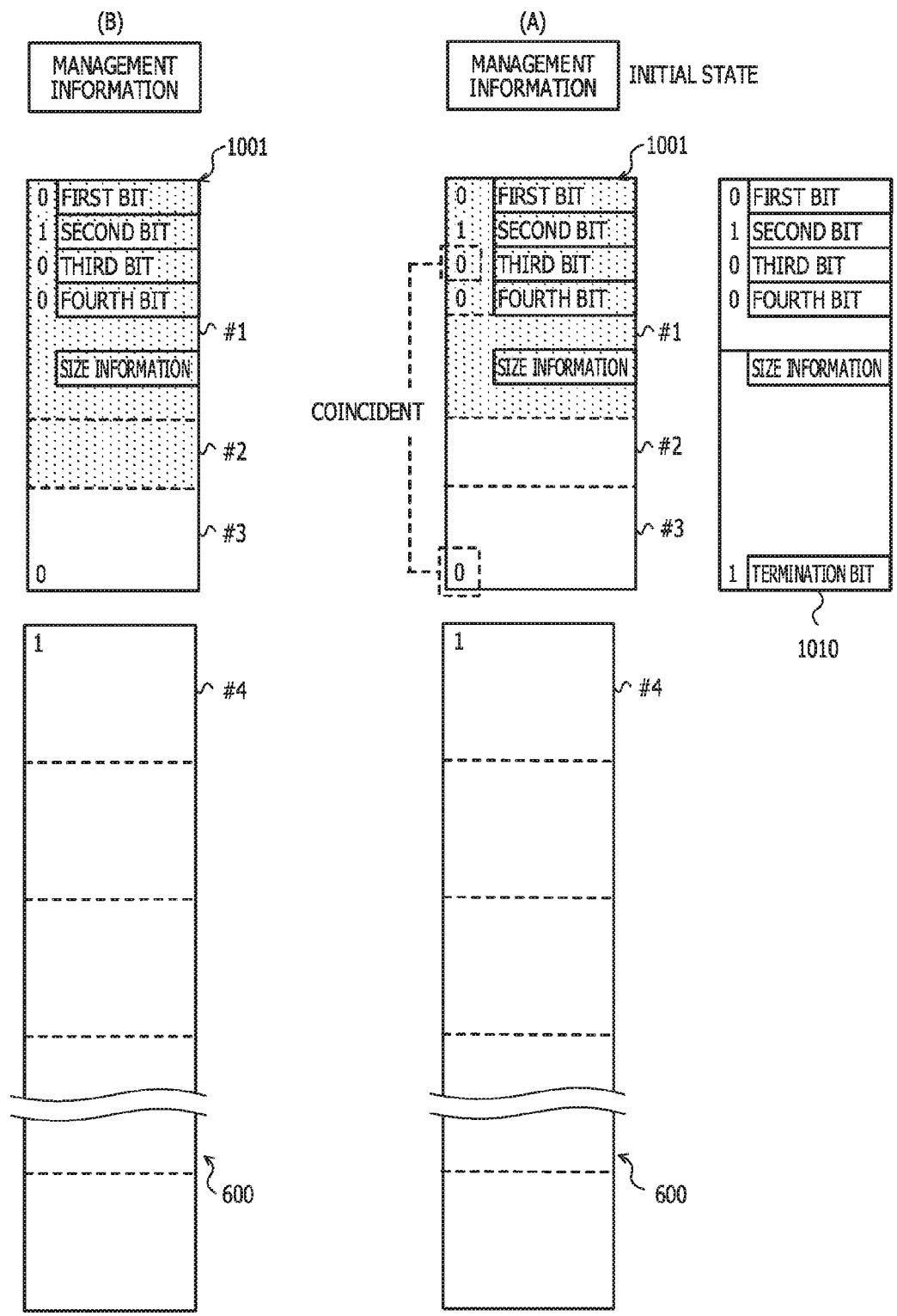
FIGS. 10A, 10B, 11, 12, and 13 are explanatory diagrams illustrating an example in which written data is written.

The state illustrated as (A) in FIG. 10A is a state in which the information recording apparatus 100 writes data, which is to be written in the head block #1 in the first writing destination region 1001 in the first writing target data 1010 corresponding to the three blocks in the head block #1 of the first writing destination region 1001. The state illustrated as (A) in FIG. 10A is a state before the writing of the first writing target data 1010 is completed, and a state in which the third bit coincides with the value at the termination position of the first writing destination region 1001.

The state illustrated as (B) in FIG. 10A is a state in which the information recording apparatus 100 writes the data, which is to be written in the second block #2 from the head of the first writing destination region 1001, in the first writing target data 1010 in the second block #2 from the head of the first writing destination region 1001. The state illustrated as (B) in FIG. 10A is a state before the writing of the first writing target data 1010 is completed.

Figure 10B:
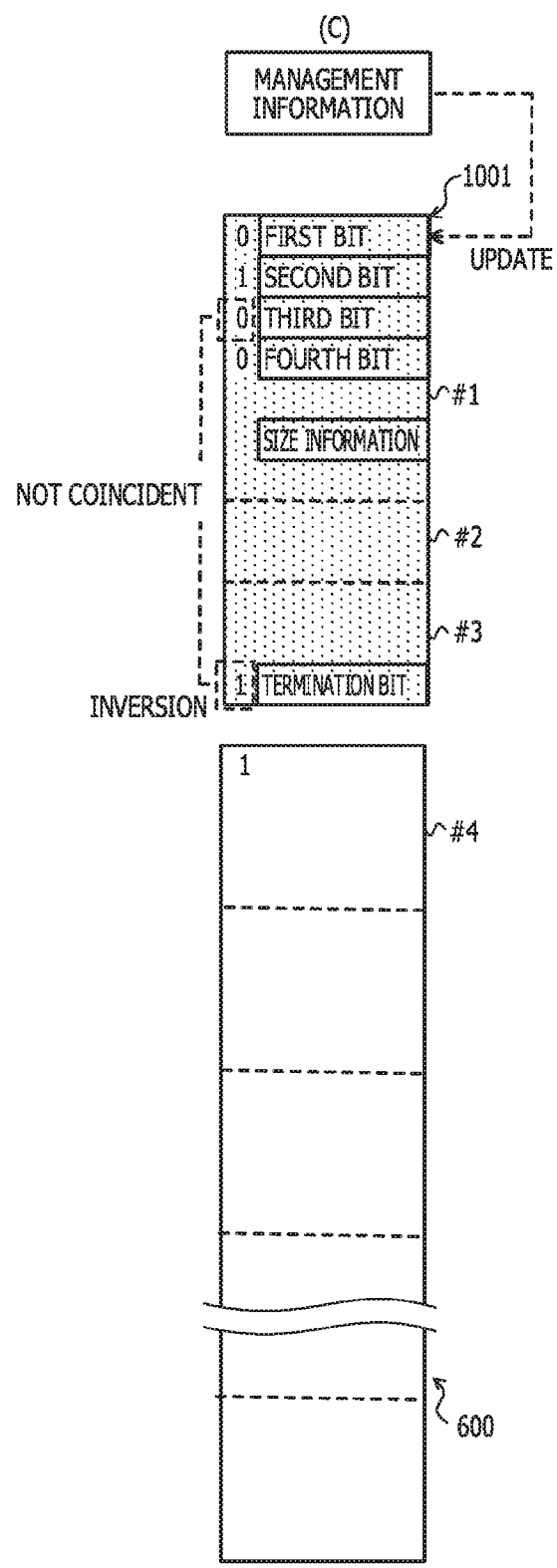

The state illustrated as (C) in FIG. 10B is a state in which the information recording apparatus 100 writes the data, which is to be written in the termination block #3 in the first writing destination region 1001, in the first writing target data 1010 in the termination block #3 in the first writing destination region 1001. The state illustrated as (C) in FIG. 10B is a state after the writing of the first writing target data 1010 has been completed. In addition, the state illustrated as (C) in FIG. 10B is a state in which the third bit does not coincide with the value at the termination position of the first writing destination region 1001 as a result of rewriting the value at the termination position of the first writing destination region 1001 with the value at the termination of the first writing target data 1010.

Here, the information recording apparatus 100 completes the writing of the first writing target data 1010 and then writes information for specifying a writing start position of new writing target data in the RAM 403. The information recording apparatus 100 writes, in the RAM 403, information of the head block #0 of the first writing destination region 1001 in which the first writing target data 1010 is written or information of the termination block #3, for example. In addition, the information recording apparatus 100 may write, in the RAM 403, information at the head position of the fourth block #4 from the head of the ring buffer 601, which is the block following the first writing destination region 1001 where the first writing target data 1010 has been written.

In doing so, the information recording apparatus 100 can change a state related to whether or not the third bit and the value at the termination position of the first writing destination region 1001 coincide with each other between the state before completion of the writing of the first writing target data 1010 and the state after completion of the writing. In other words, the information recording apparatus 100 can achieve a state in which it is possible to determine whether or not the writing of the first writing target data 1010 has been completed by comparing the third bit and the value at the termination position of the first writing destination region 1001 without updating the management information.

In addition, the information recording apparatus 100 may update the management information in a case of writing data for the first time in the ring buffer 601. In doing so, the information recording apparatus 100 can fix that no data has been written in the ring buffer 601 in a case in which the management information is not updated from the initial value. Next, a description of FIG. 11 will be given.

Figure 11:
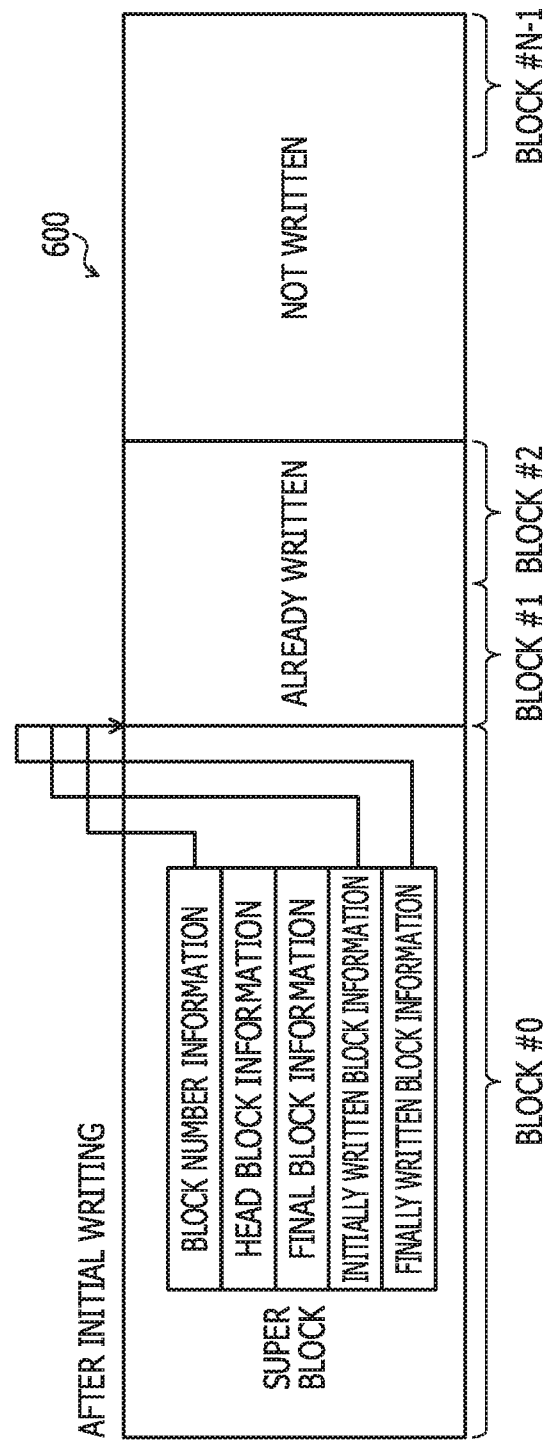

In FIG. 11, the information recording apparatus 100 updates the management information since the information recording apparatus 100 writes data for the first time in the ring buffer 601. The information recording apparatus 100 updates the initially written block information, for example, in the management information as the identification information of the head block #1 in the first writing destination region 1001. In addition, the information recording apparatus 100 updates the finally written block information as the identification information of the head block #1 in the first writing destination region 1001. Next, a description will be given of FIG. 12.

Figure 12:
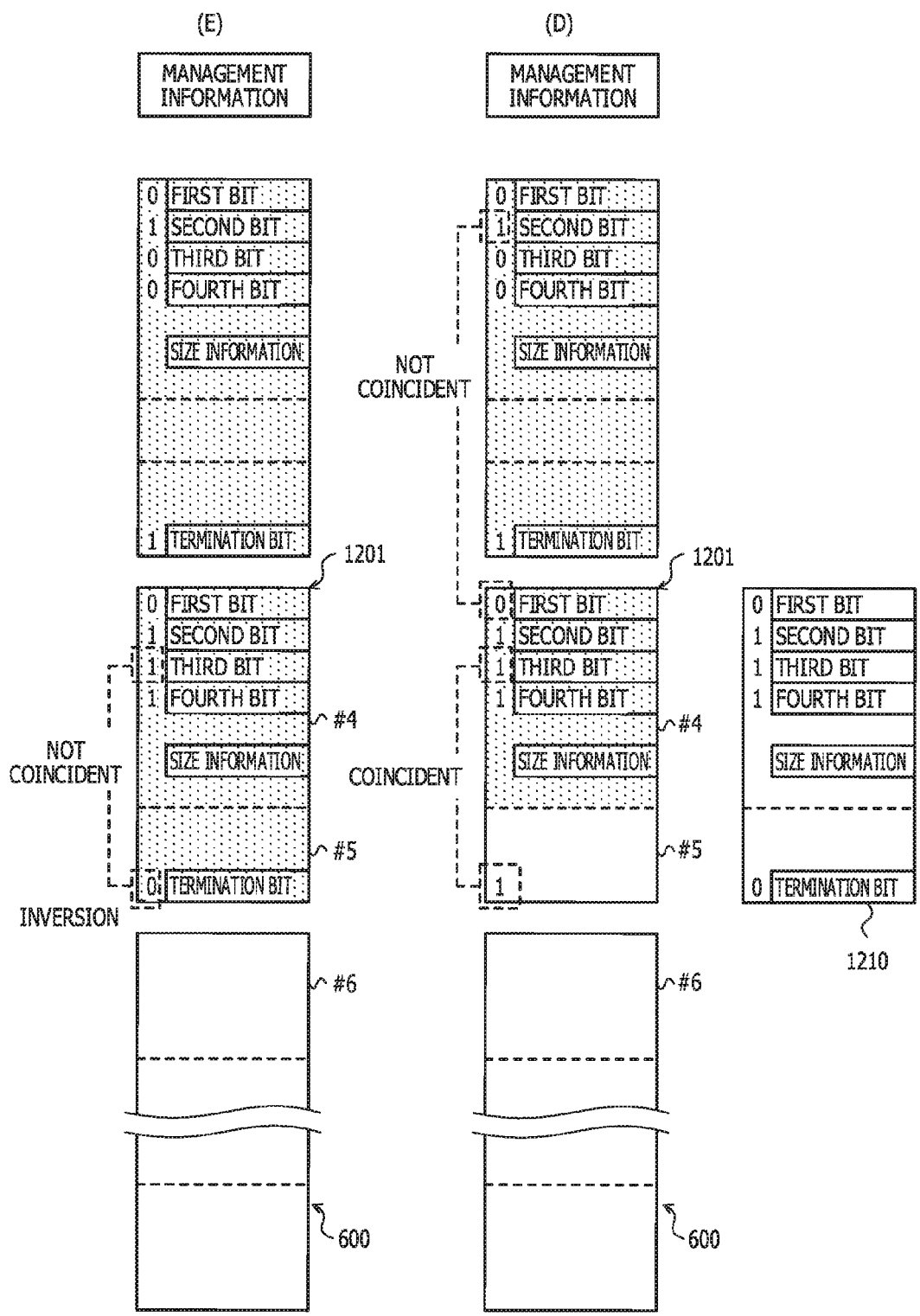

In FIG. 12, the information recording apparatus 100 newly receives second target data and then reads information for specifying a writing start position of the new writing target data written in the RAM 403. The information recording apparatus 100 specifies a head position of the fourth block #4 from the head of the ring buffer 601 as the writing start position based on information for specifying the writing start position of the read new writing target data.

Next, the information recording apparatus 100 specifies the data size of two blocks as the size of the second writing target data 1210 based on the size of the second target data. The information recording apparatus 100 specifies storage regions #4 and #5, which corresponds to two blocks from the writing start position, as a second writing destination region 1201 in which the second writing target data 1210 is written. Then, the information recording apparatus 100 generates the second writing target data 1210 which includes the second target data and corresponds to the two blocks and writes the second writing target data 1210 in units of blocks in the second writing destination region 1201. States illustrated as (D) and (E) in FIG. 12 are states of the ring buffer 601 when the second writing target data 1210 is written in units of blocks in the second writing destination region 1201.

The state illustrated as (D) in FIG. 12 is a state in which the information recording apparatus 100 writes data, which is to be written at the head block #4 of the second writing destination region 1201, in the second writing target data 1210 corresponding to the two blocks in the head block in the second writing destination region 1201. The state illustrated as (D) in FIG. 12 is a state before the writing of the second writing target data 1210 is completed, and a state in which the third bit and the value at the termination position of the second writing destination region 1201 coincide with each other. In addition, the state illustrated as (D) in FIG. 12 is a state in which the second bit of the first writing target data 1010 does not coincide with the value at the head position of the second writing destination region 1201 as a result of rewriting the value at the head position of the second writing destination region 1201 with the first bit.

The state illustrated as (E) in FIG. 12 is a state in which the information recording apparatus 100 writes data, which is to be written in the termination block #5 of the second writing destination region 1201, in the second writing target data 1210 corresponding to two blocks in the termination block #5 of the second writing destination region 1201. The state illustrated as (E) in FIG. 12 is a state after the writing of the second writing target data 1210 has been completed. In addition, the state as illustrated as (E) in FIG. 12 is a state in which the third bit does not coincide with the value at the termination position of the second writing destination region 1201 as a result of rewriting the value at the termination position of the second writing destination region 1201 with the value at the termination of the second writing target data 1210.

Here, the information recording apparatus 100 completes the writing of the second writing target data 1210 and then writes, in the RAM 403, information for specifying a writing start position of new writing target data. The information recording apparatus 100 writes, in the RAM 403, information of the head block #4 of the second writing destination region 1201 in which the second writing target data 1210 has been written or information of the termination block #5, for example. In addition, the information recording apparatus 100 may write, in the RAAM 403, information of the head position of the sixth block #6 from the head of the ring buffer 601, which is a block following the second writing destination region 1201 where the second writing target data 1210 has been written.

In doing so, the information recording apparatus 100 can change a state related to whether or not the third bit and the value at the termination position of the second writing destination region 1201 coincide with each other between the state before completion of the writing of the second writing target data 1210 and the state after completion of the writing. In other words, the information recording apparatus 100 can achieve a state in which it is possible to determine whether or not the writing of the second writing target data 1210 has been completed by comparing the third bit and the value at the termination position of the second writing destination region 1201 without updating the management information.

In addition, the information recording apparatus 100 can change a state related to whether or not the second bit of the first writing target data 1010 and the value at the head position of the second writing destination region 1201 coincide with each other, before the writing of the second writing target data 1210 is started and after the writing is started. In other words, the information recording apparatus 100 can achieve a state in which it is possible to determine whether or not the writing of the second writing target data 1210 has been started by comparing the second bit of the first writing target data 1010 and the value at the head position of the second writing destination region 1201.

Thereafter, the information recording apparatus 100 sequentially write the writing target data in the ring buffer 601 in the same manner. Here, it is assumed that the information recording apparatus 100 has written the writing target data up to the block #N−2 in the ring buffer 601. Next, a description will be given of FIG. 13.

Figure 13:
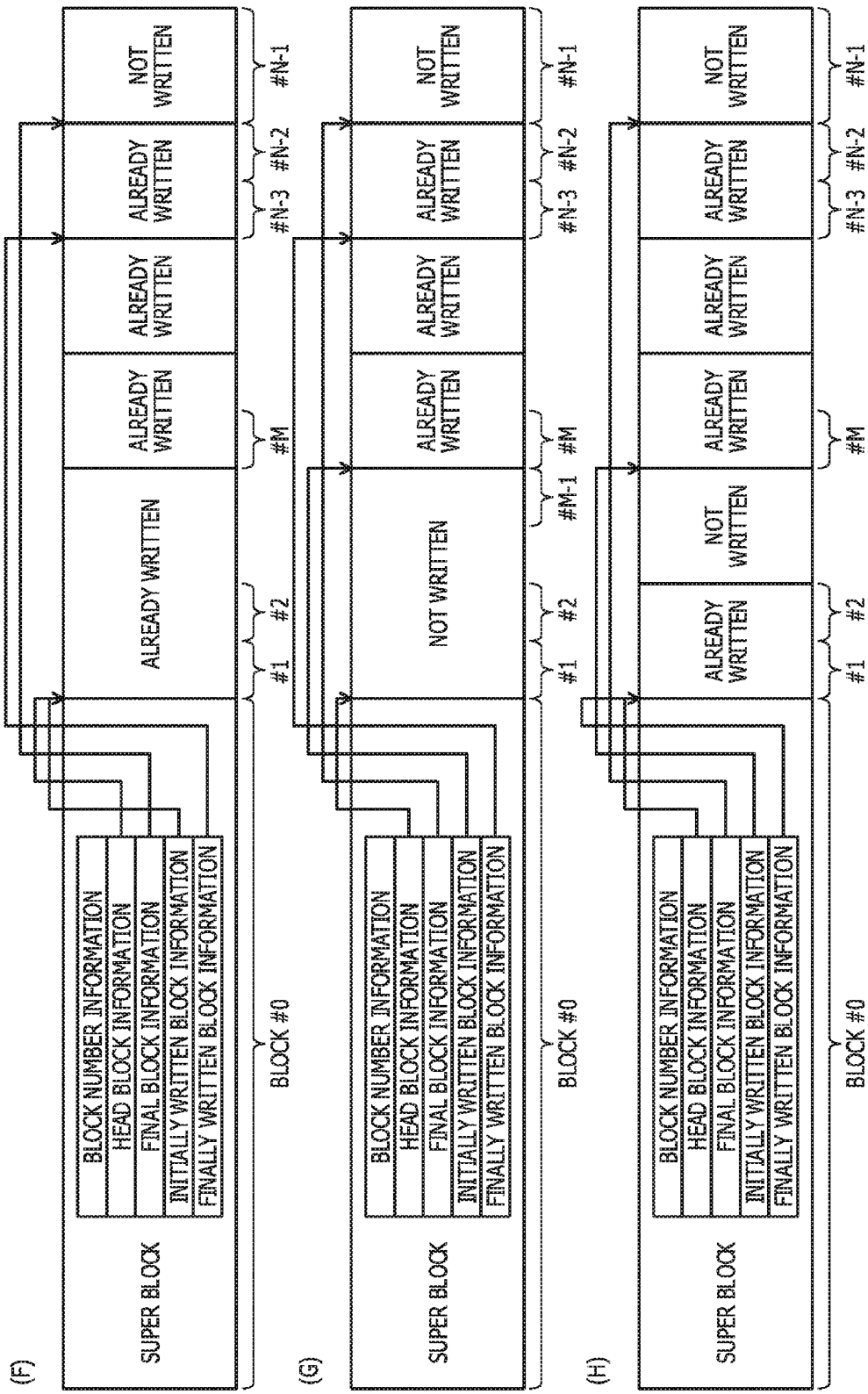

In FIG. 13, the information recording apparatus 100 writes the writing target data up to the block #N−2 near the final block #N−1 in the ring buffer 601, and if the remaining unwritten storage region in the ring buffer 601 is not enough to write the next writing target data, the information recording apparatus 100 updates the management information. Then, the information recording apparatus 100 sets some storage regions 600, in which the writing has already been performed, as unwritten storage regions to increase the unwritten storage regions. In addition, the information recording apparatus 100 may increase the unwritten storage regions by performing garbage collection. States illustrated as (F), (G), and (H) in FIG. 13 are states of the management information when the writing has been performed near the final block #N−1 and the unwritten storage region is increased by setting unwritten storage regions.

In the state illustrated as (F) in FIG. 13, the information recording apparatus 100 updates the final block information in the management information to identification information of the block #N−2 in the ring buffer 601. In addition, the information recording apparatus 100 updates the finally written block information in the management information to identification information of the head block #N−3 of the writing destination region, which includes the block #N−2, in the ring buffer 601.

In the state illustrated as (G) in FIG. 13, the information recording apparatus 100 sets an unwritten storage region since the remaining unwritten storage region in the ring buffer 601 is not enough to write the new writing target data. The information recording apparatus 100 sets the blocks #1 to #M−1, which are located in a first half of the ring buffer 601, in the blocks, in which the writing has already been performed, as the unwritten storage region. M is a number from 1 to N−1. Then, the information recording apparatus 100 updates the initially written block information in the management information to identification information of the block #M following the first half of the ring buffer 601.

In the state illustrated as (H) in FIG. 13, the information recording apparatus 100 writes new writing target data from the head position of the head block #1 in the ring buffer 601, which is set in the unwritten storage region, when the new writing target data is written. The information recording apparatus 100 writes writing target data corresponding to two blocks, for example. Then, the information recording apparatus 100 updates the finally written block information in the management information to identification of the head block #1 in the ring buffer 601. In doing so, the information recording apparatus 100 can efficiently use the storage regions in the ring buffer 601 by using some blocks, in which the writing target data is written in an early stage, as unwritten storage regions.

Exemplary Operation when Power Supply is Stopped

Next, a description will be given of an exemplary operation of the information recording apparatus 100 when power supply is stopped, with reference to FIG. 14.

Figure 14:
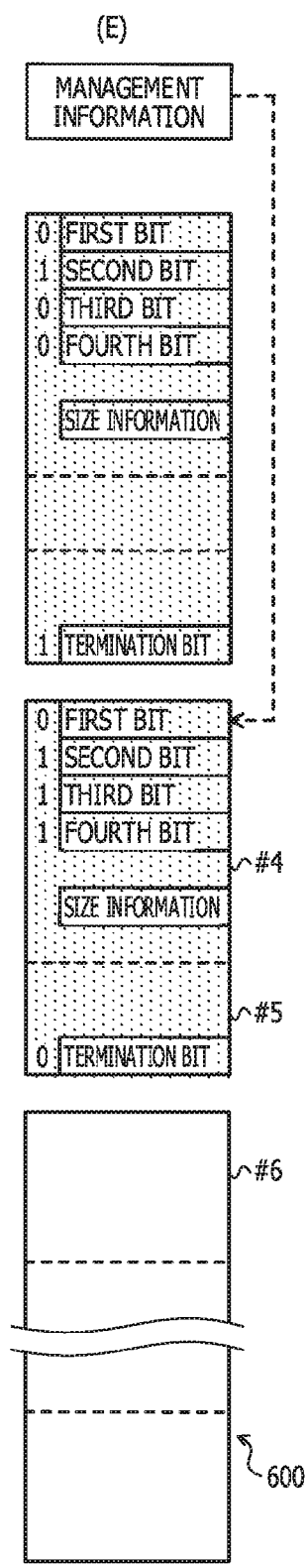
FIG. 14 is an explanatory diagram illustrating an exemplary operation that is performed when power supply is stopped.

FIG. 14 is an explanatory diagram illustrating an exemplary operation performed when power supply is stopped. In FIG. 14, it is assumed that the information recording apparatus 100 has received a request for being shut down and stopping power supply in the state illustrated as (E) in FIG. 12. At this time, the information recording apparatus 100 updates the management information before being shut down. The information recording apparatus 100 updates the finally written block information, for example, in the management information to the identification information of the head block of the second writing destination region 1201. In doing so, the information recording apparatus 100 can efficiently specify the termination position of the data writing based on the management information when the information recovering apparatus 100 recovers from the state in which the power supply is stopped.

In contrast, the information recording apparatus 100 does not have to update the management information before being shut down in some cases, or there may be a case in which the power supply is stopped due to an accident or a failure before updating the management information. The accident or the failure include, for example, interruption of an electric service, malfunction of programs, or forced termination by an input of an operation from a user. Even in such cases, the information recording apparatus 100 can specify the termination position of the data writing based on the first information and the second information of the respective writing target data in the ring buffer 601 when the information recording apparatus 100 recovers from the state in which the power supply is stopped.

One Example of Specifying Termination Position of Writing

Next, a description will be given of an example in which the information recording apparatus 100 specifies the termination position of the writing with reference to FIGS. 15, 16, 17, and 18.

Figure 15:
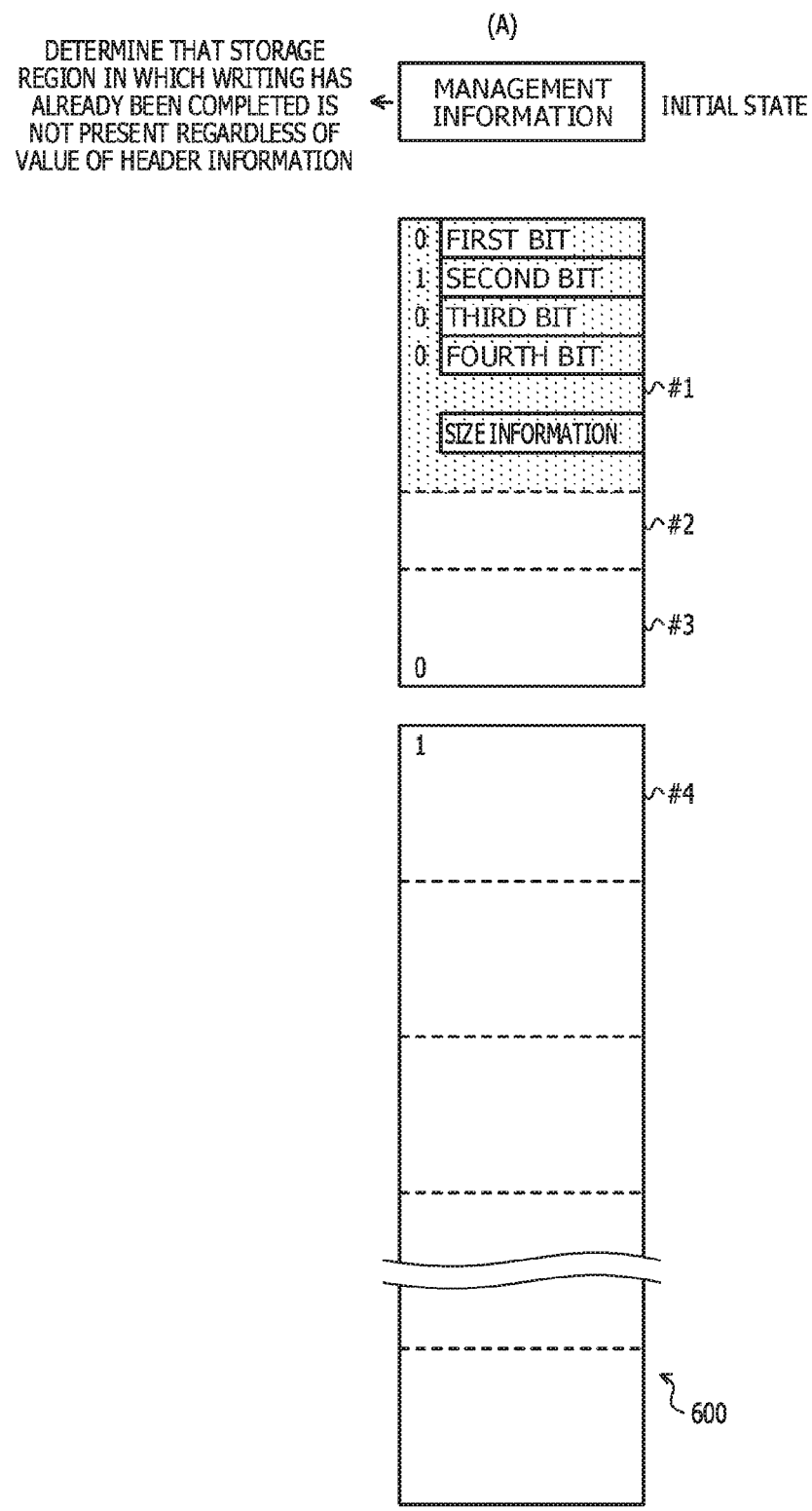
FIGS. 15, 16, 17, and 18 are explanatory diagrams illustrating an example in which the information recording apparatus specifies a termination position of writing.

FIGS. 15, 16, 17, and 18 are explanatory diagrams illustrating an example in which the information recording apparatus 100 specifies the termination position of the writing. The example illustrated in FIG. 15 is an example in which the power supply is stopped without updating the management information in the state illustrated as (A) in FIG. 10.

In FIG. 15, the information recording apparatus 100 recovers from the state in which the power supply is stopped, and then reads the management information. The information recording apparatus 100 determines that the writing target data has not been written in the ring buffer 601 or initial writing of the writing target data has been failed since the initially written block information in the management information is the initial value. Therefore, the information recording apparatus 100 determines that there is no storage region, in which the writing of the writing target data has been completed, in the ring buffer 601 and the termination of the data writing is not present. The information recording apparatus 100 does not determine erroneously that the initial writing of the writing target data has been completed in the case in which the initial writing of the writing target data has been partially successfully made and the writing of the remaining part has been failed, as illustrated in FIG. 15. In doing so, the information recording apparatus 100 can specify the head position of the head block #1 in the ring buffer 601 as the writing start position regardless of the value of the head block #1 in the ring buffer 601 when new writing target data is written. Then, the information recording apparatus 100 can write the new writing target data in the storage region, in which the writing target data has not been written or the initial writing of the writing target data has been failed. Next, a description will be given of FIG. 16.

Figure 16:
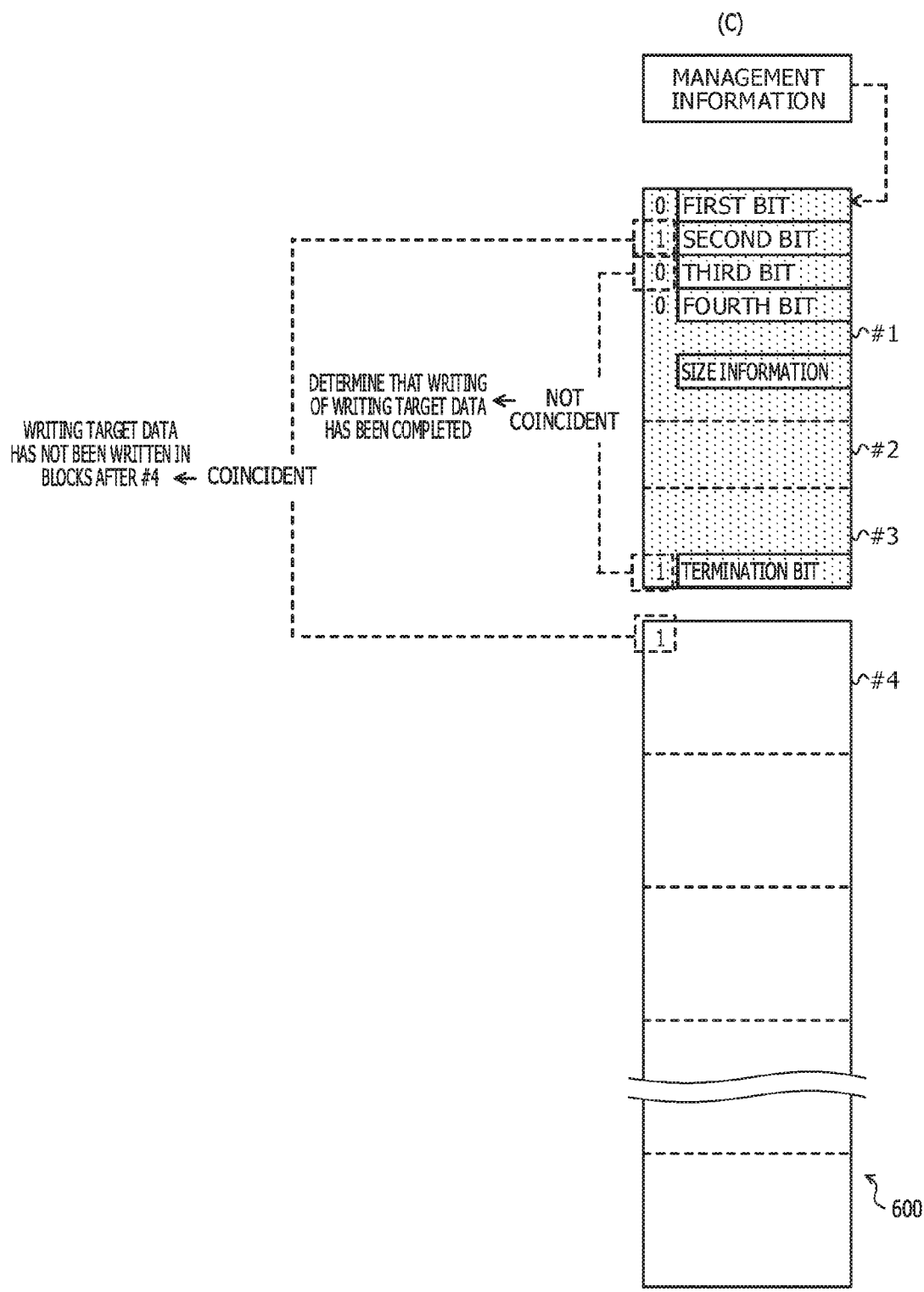

The example illustrated in FIG. 16 is an example in which the power supply is stopped without updating the management information in the state illustrated as (C) in FIG. 10. In FIG. 16, the information recording apparatus 100 recovers from the state in which the power supply is stopped, and then reads the management information. The information recording apparatus 100 determines that at least one writing target data item has been written from the head block #1 in the ring buffer 601 since the initially written block information in the management information is information that indicates the head block #1 in the ring buffer 601.

Next, the information recording apparatus 100 extracts the second bit and the size information that indicates the size of the target data from the head block #1 in the ring buffer 601. The information recording apparatus 100 specifies the first writing destination region 1001, which corresponds to three blocks from the head block in the ring buffer 601, as the writing destination region in which the writing target data has been written based on the size information. Then, the information recording apparatus 100 determines whether or not the second bit and the value at the head position of the fourth block #4 from the head of the ring buffer 601, which is a block following the first writing destination region 1001, coincide with each other. Here, since the second bit and the value at the head of the fourth block #4 coincide with each other, the information recording apparatus 100 determines that no data has been written in blocks after the block #4 following the first writing destination region 1001.

Accordingly, the information recording apparatus 100 determines that the first writing destination region 1001 is the final storage region in which the writing target data has successfully been written, and specifies the termination of the first writing destination region 1001 as the termination of the data writing. Next, a description will be given of FIG. 17.

Figure 17:
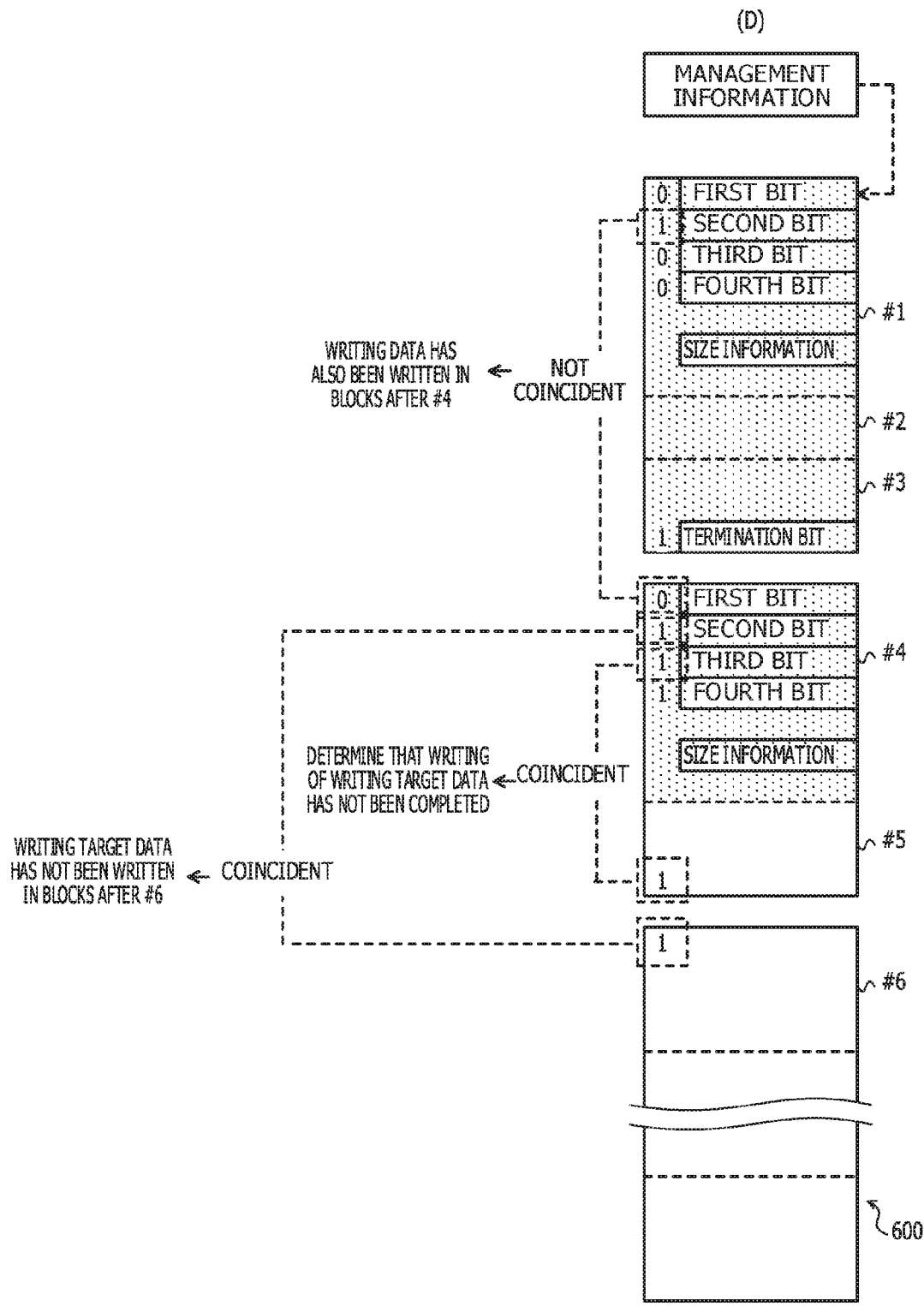

The example illustrated in FIG. 17 is an example in which the power supply is stopped without updating the management information in the state illustrated as (D) in FIG. 12. In FIG. 17, the information recording apparatus 100 recovers from the state in which the power supply is stopped, and the reads the management information. The information recording apparatus 100 determines that at least one writing target data item has been written from the head block #1 in the ring buffer 601 since the initially written block information in the management information is information that indicates the head block #1 in the ring buffer 601.

Next, the information recording apparatus 100 extracts the second bit and the size information that indicates the size of the target data from the head block #1 in the ring buffer 601. The information recording apparatus 100 specifies the first writing destination region 1001, which corresponds to three blocks from the head block in the ring buffer 601, as the writing destination region in which the writing target data has been written base on the size information. Then, the information recording apparatus 100 determines whether or not the second bit and the value at the head position of the fourth block #4 from the head of the ring buffer 601, which is a block following the first writing destination region 1001, coincide with each other. Here, since the second bit and the value at the head position of the fourth block #4 do not coincide with each other, the information recording apparatus 100 determines that the writing target data has also been written in the blocks after the fourth block #4 from the head of the ring buffer 601, which is the block following the first writing destination region 1001.

Next, the information recording apparatus 100 extracts the second bit, the third bit, and the size information that indicates the size of the target data from the fourth block #4 form the head of the ring buffer 601. The information recording apparatus 100 specifies the second writing destination region 1201, which corresponds to two blocks from the fourth block #4 from the head of the ring buffer 601, as the writing destination region in which the writing target data has been written based on the size information. Then, the information recording apparatus 100 determines whether or not the second bit and the value at the head position of the sixth block #6 from the head of the ring buffer 601, which is the block following the second writing destination region 1201, coincide with each other. Here, since the second bit and the value at the head position of the sixth block #6 coincide with each other, the information recording apparatus 100 determines that the writing target data has not been written in blocks after the sixth block #6 from the head of the ring buffer 601, which is the block following the second writing destination region 1201.

Next, the information recording apparatus 100 determines whether or not the third bit and the value at the termination position of the second writing destination region 1201 coincide with each other. Here, since the third bit and the value at the termination position of the second writing destination region 1201 coincide with each other, the information recording apparatus 100 determines that the writing of the writing target data in the second writing destination region 1201 has been failed and has not been completed.

Therefore, the information recording apparatus 100 determines that the first writing destination region 1001 is the final storage region in which the writing target data has successfully been written, and specifies the termination of the first writing destination region 1001 as the termination of the data writing. Next, a description will be given of FIG. 18.

Figure 18:
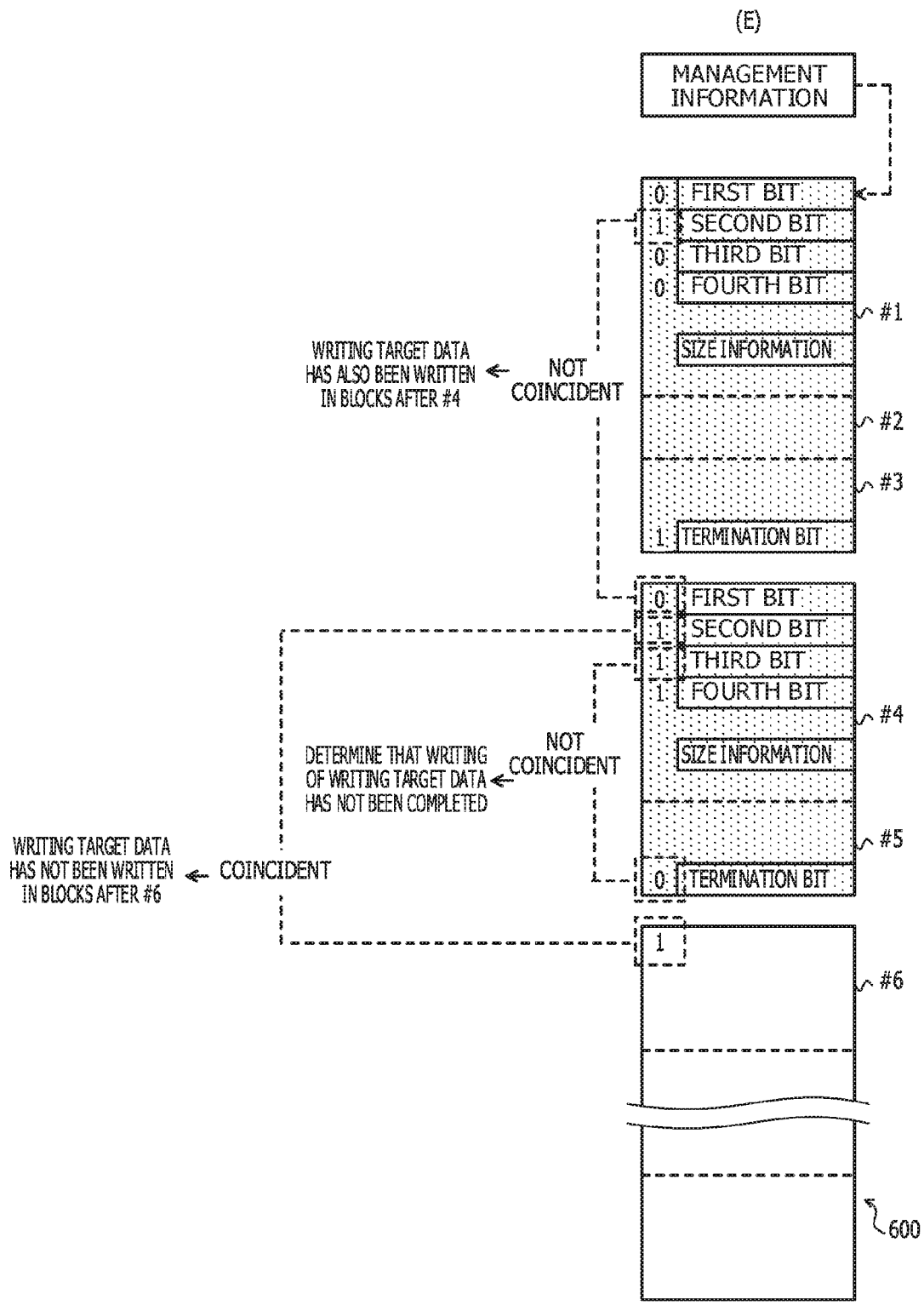

The example illustrated in FIG. 18 is an example in which the power supply is stopped without updating the management information in the state illustrated as (E) in FIG. 12. In FIG. 18, the information recording apparatus 100 recovers the state in which the power supply is stopped and then reads the management information. The information recording apparatus 100 determines that at least one writing target data item has been written in the blocks after the head block #1 in the ring buffer 601 since the initially written block information in the management information is information that indicates the head block #1 in the ring buffer 601.

Next, the information recording apparatus 100 extracts the second bit and the size information that indicates the size of the target data from the head block #1 in the ring buffer 601. The information recording apparatus 100 specifies the first writing destination region 1001, which corresponds to three blocks from the head block of the ring buffer 601, as the writing destination region in which the writing target data has been written based on the size information. Then, the information recording apparatus 100 determines whether or not the second bit and the value at the head position of the fourth block #4 from the head of the ring buffer 601, which is the block following the first writing destination region 1001, coincide with each other. Here, since the second bit and the value at the head position of the fourth block #4 do not coincide with each other, the information recording apparatus 100 determines that the writing target data has also been written in the blocks after the fourth block #4 from the head of the ring buffer 601, which is the block following the first writing destination region 1001.

Next, the information recording apparatus 100 extracts the second bit, the third bit, and the size information that indicates the size of the target data from the fourth block #4 from the head of the ring buffer 601. The information recording apparatus 100 determines that the second writing destination region 1201, which corresponds to two blocks from the fourth block #4 from the head of the ring buffer 601, as the writing destination region in which the writing target data has been written based on the size information. Then, the information recording apparatus 100 determines whether or not the second bit and the value at the head position of the sixth block #6 from the head of the ring buffer 601, which is the block following the second writing destination region 1201, coincide with each other. Here, since the second bit and the value at the head position of the sixth block #6 coincide with each other, the information recording apparatus 100 determines that the writing target data has not been written in the blocks after the sixth block #6 from the head of the ring buffer 601, which is the block following the second writing destination region 1201.

Next, the information recording apparatus 100 determines whether or not the third bit and the value at the termination position of the second writing destination region 1201 coincide with each other. Here, since the third bit and the value at the termination position of the second writing destination region 1201 do not coincide with each other, the information recording apparatus 100 determines that the writing of the writing target data in the second writing destination region 1201 has not been failed and has been completed. Therefore, the information recording apparatus 100 determines that the second writing destination region 1201 is the final storage region in which the writing target data has successfully been written, and specifies the termination of the second writing destination region 1201 as the termination of the data writing. The information recording apparatus 100 can specify the termination position of the data writing without updating the management information as illustrated in FIGS. 16, 17, and 18.

In doing so, the information recording apparatus 100 can specify the head position of the block following the termination of the data writing as the newest writing start position and can write new writing target data from the newest writing start position. In addition, the information recording apparatus 100 does not determine erroneously that the storage region in which the writing of the writing target data has been failed is a storage region in which the writing has already been performed. In addition, the information recording apparatus 100 can specify a range from the block that is identified by the initially written block information to the termination position of the data writing on the ring buffer 601 as a range of the storage region in which the writing has already been performed, without updating the management information. In addition, the information recording apparatus 100 can read the writing target data written in the range of the storage region in which the writing has already been performed.

One Example of Procedure for Writing Processing

Next, a description will be given of an example of a procedure for writing processing with reference to FIGS. 19 and 20.

Figure 19:
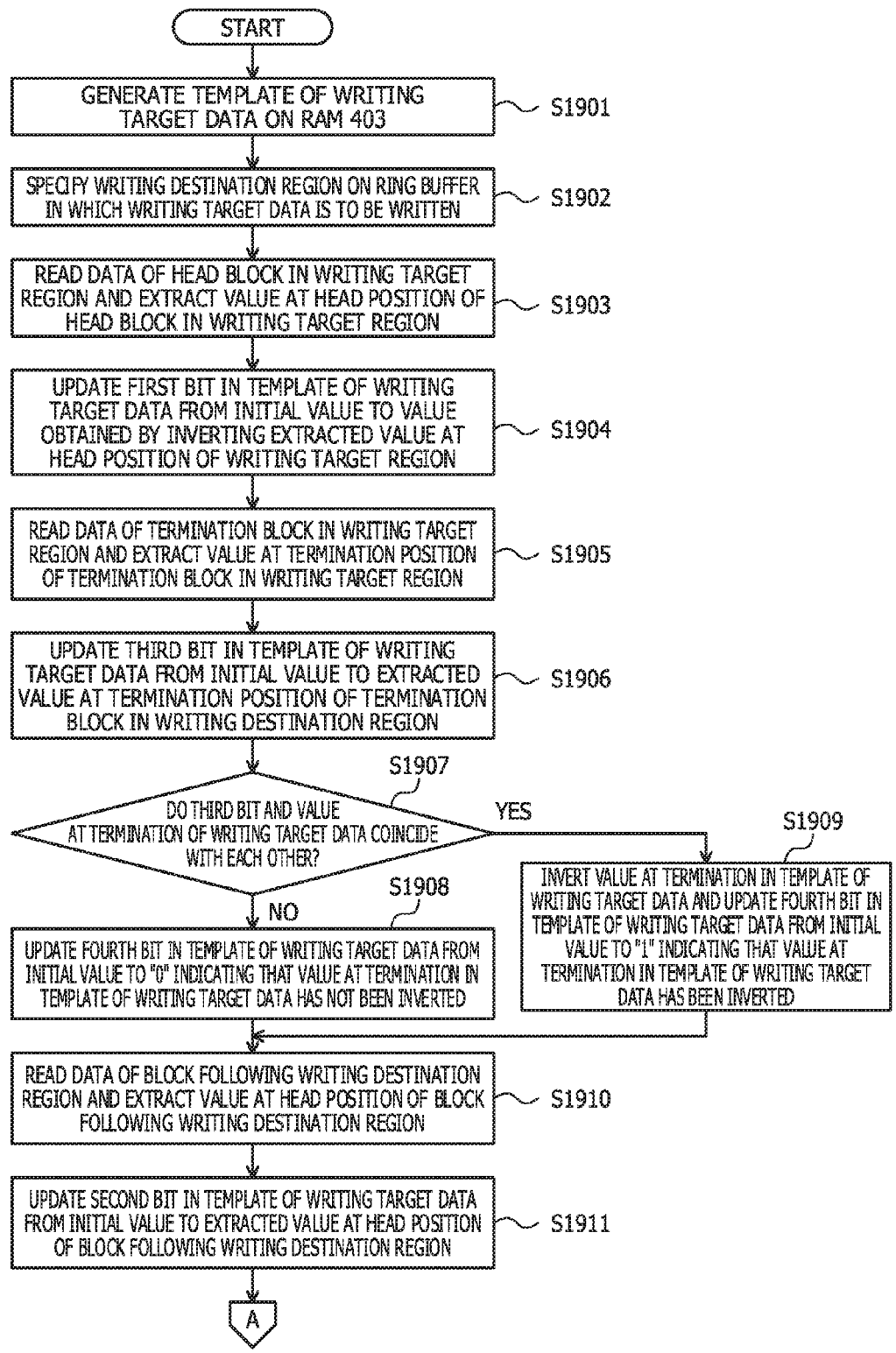
FIGS. 19 and 20 are flowcharts illustrating an example of a procedure for writing processing.
Figure 20:
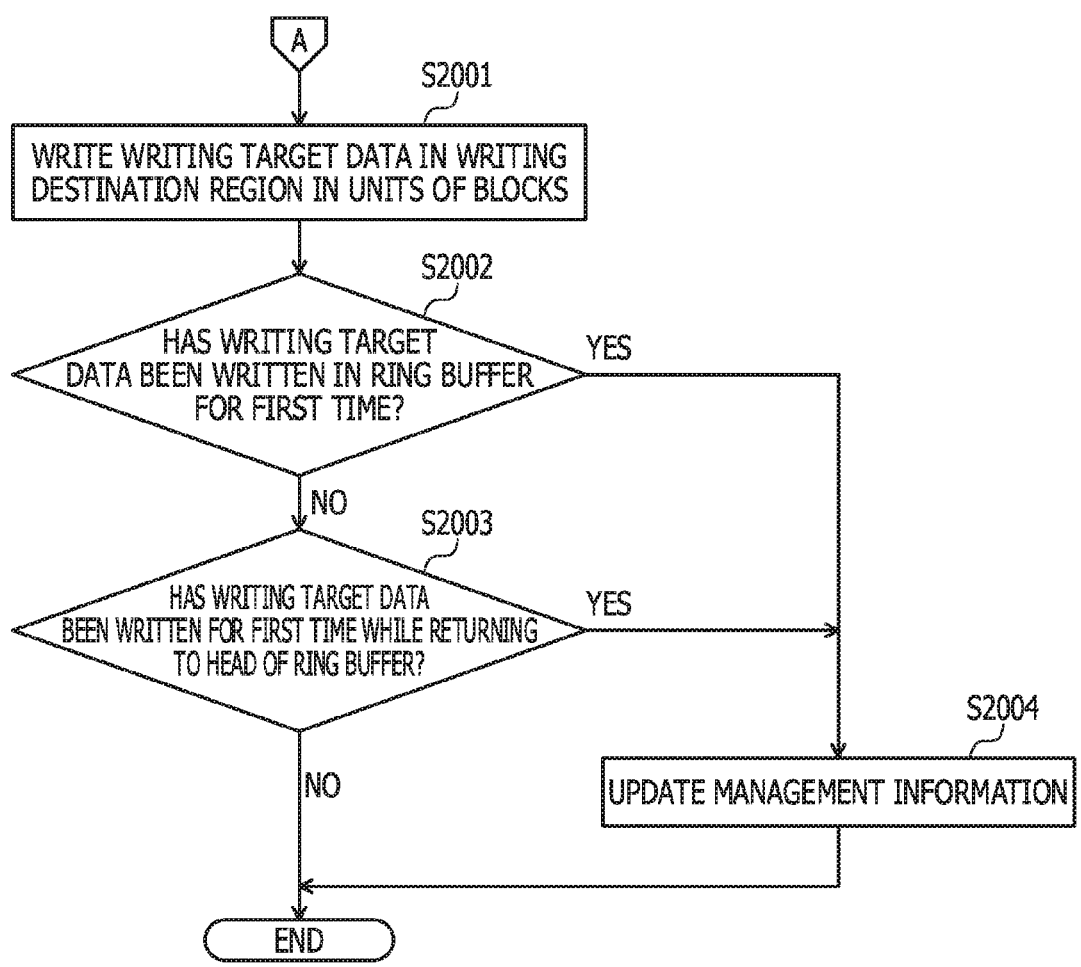

FIGS. 19 and 20 are flowcharts illustrating an example of a procedure for writing processing. In FIG. 19, the information processing apparatus 100 specifies the size of the writing target data that includes the header information and the target data based on the size of the target data, and generates a template of the writing target data on the RAM 403 (Step S1901). For example, the template of the writing target data includes, as the header information, the first bit, the second bit, the third bit, and the fourth bit, for each of which an initial value has been set.

Next, the information recording apparatus 100 specifies a writing destination region, in which the writing target data is to be written, in the ring buffer (Step S1902). Then, the information recording apparatus 100 reads data in the head block of the writing destination region and extracts a value at the head position of the head block in the writing destination region (Step S1903). Then, the information recording apparatus 100 updates the first bit in the template of the writing target data from the initial value to a value obtained by inverting the extracted value at the head position of the writing destination region (Step S1904). Then, the information recording apparatus 100 reads data in the termination block in the writing destination region and extracts a value at the termination position of the termination block in the writing destination region (Step S1905).

Next, the information recording apparatus 100 updates the third bit in the template of the writing target data from the initial value to the extracted value at the termination position of the termination block in the writing destination region (Step S1906). Then, the information recording apparatus 100 determines whether or not the third bit and the value at the termination in the template of the writing target data coincide with each other (Step S1907). Here, if the third bit and the value at the termination in the template do not coincide with each other (No in Step S1907), the information recording apparatus 100 updates the fourth bit in the template of the writing target data from the initial value to "0" that indicates that the value at the termination in the template of the writing target data has not been inverted (Step S1908) and moves on to processing in Step S1910.

In contrast, if the third bit and the value at the termination in the template coincide with each other (Yes in Step S1907), the information recording apparatus 100 inverts the value at the termination in the template of the writing target data, updates the fourth bit in the template of the writing target data from the initial value to a value "1" that indicates that the value at the termination in the template of the writing target data has been inverted (Step S1909), and moves on to processing in Step S1910.

Next, the information recording apparatus 100 reads data in a block following the writing destination region and extracts a value at the head position of the block following the writing destination region (Step S1910). Then, the information recording apparatus 100 updates the second bit in the template of the writing target data from the initial value to the extracted value at the head position of the block following the writing destination region (Step S1911).

If the information recording apparatus 100 completes the processing in Steps S1901 to S1911, the information recording apparatus 100 fixes the template of the writing target data on the RAM 403 as the writing target data. In doing so, the information recording apparatus 100 can generate the writing target data that includes the header information and the target data. Next, the information recording apparatus 100 moves on to processing in Step S2001 illustrated in FIG. 20.

In FIG. 20, the information recording apparatus 100 writes the writing target data in the writing destination region in units of blocks (Step S2001). The information recording apparatus 100 may divide the writing target data into data to be written in the head block of the writing destination region, data to be written in an intermediate block from the second block of the writing destination region and a block immediately before the termination block, and data to be written in the termination block of the writing destination region.

At this time, the information recording apparatus 100 starts the writing of the data, which is to be written in the intermediate block of the writing destination region, in the intermediate block of the writing destination region after completing the writing of the data, which is to be written in the head block of the writing destination region, in the head block of the writing destination region. In addition, the information recording apparatus 100 starts the writing of the data, which is to be written in the termination block of the writing destination region, in the termination block of the writing destination region after completing the writing of the data, which is to be written in the intermediate block of the writing destination region, in the intermediate block of the writing destination region.

Then, the information recording apparatus 100 determines whether or not a state in which the writing target data has been written for the first time in the ring buffer has been obtained (Step S2002). Here, if the state in which the writing target data has been written for the first time has not been achieved (No in Step S2002), the information recording apparatus 100 returns to the head of the ring buffer and determines whether or not the state in which the writing target data has been written for the first time has been achieved (Step S2003). Here, if the information recording apparatus 100 returns to the head of the ring buffer and determines that the state in which the writing target data has been written for the first time has not been achieved (No in Step S2003), the information recording apparatus 100 completes the writing processing.

In contrast, if it is determined that the state in which the writing target data has been written for the first time has been achieved (Yes in Step S2002), or if the information recording apparatus 100 returns to the head of the ring buffer and determines that the state in which the writing target data has been written for the first time has been achieved (Yes in Step S2003), the information recording apparatus 100 updates the management information (Step S2004). Then, the information recording apparatus 100 completes the writing processing. In doing so, the information recording apparatus 100 can write the header information as the writing target data along with the target data.

One Example of Procedure for Decision Processing

Next, a description will be given of an example of a procedure for decision processing with reference to FIGS. 21 and 22.

Figure 21:
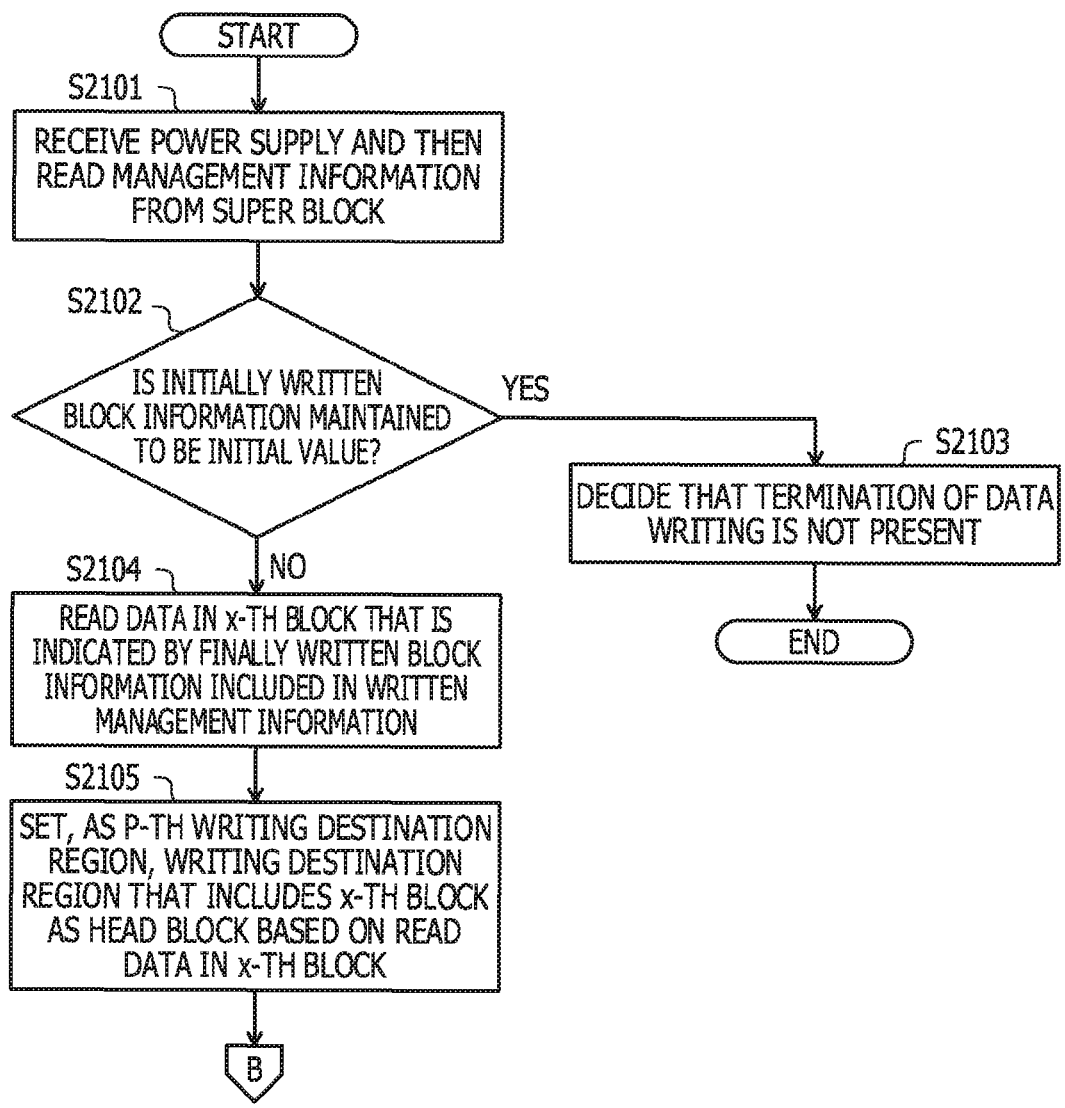
FIGS. 21 and 22 are flowcharts illustrating an example of a procedure for determination processing.
Figure 22:
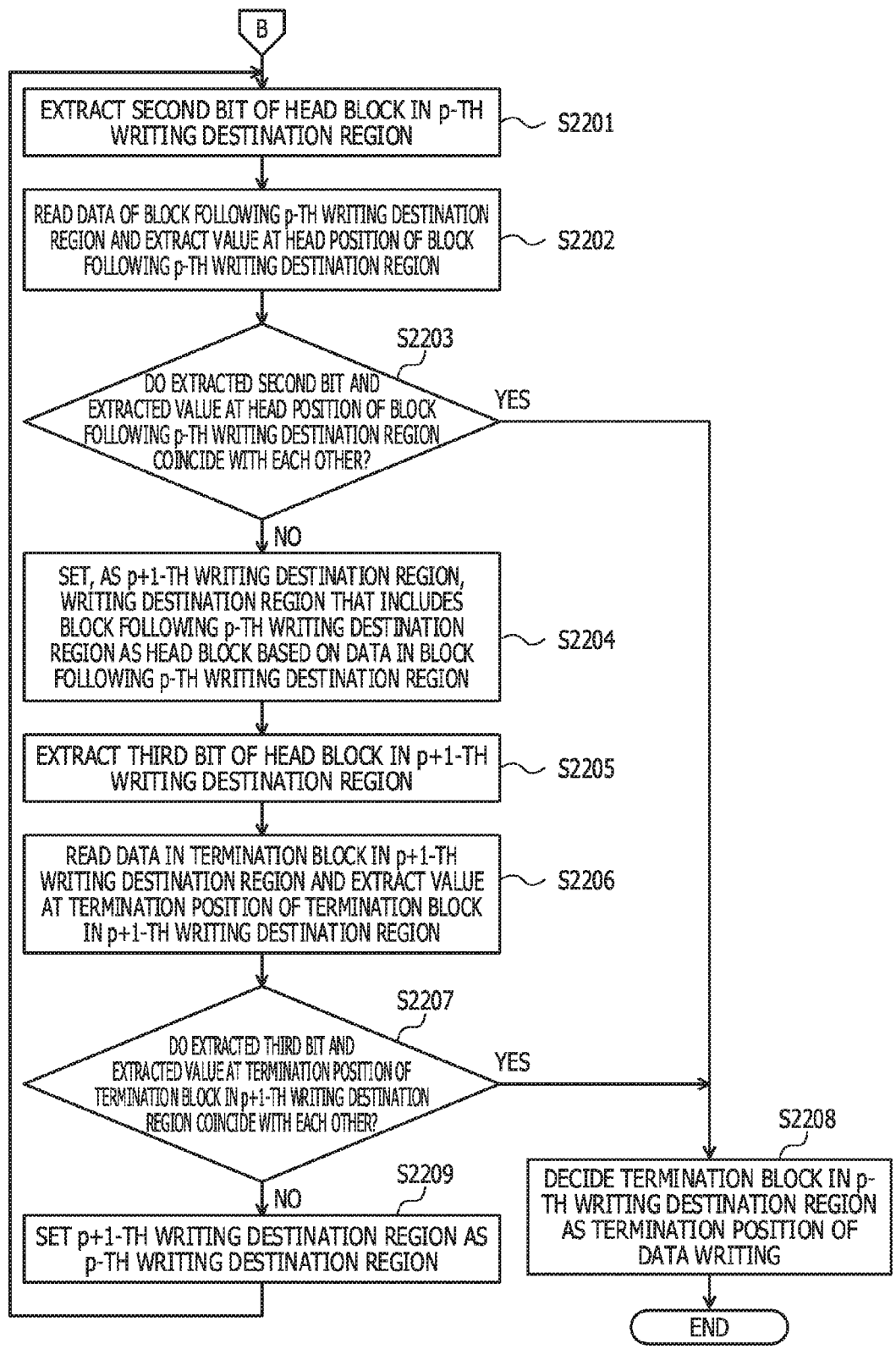

FIGS. 21 and 22 are flowcharts illustrating an example of a procedure for decision processing. In FIG. 21, the information recording apparatus 100 receives power supply and then reads the management information from the super block (Step S2101). Then, the information recording apparatus 100 determines whether or not the initially written block information that is included in the read management information is maintained to be an initial value (Step S2102). The initial value is a value indicating that the writing target data has not been written in the ring buffer. Here, if the initially written block information is the initial value (Yes in Step S2102), the information recording apparatus 100 decides that the termination of the data writing is not present (Step S2103). Then, the information recording apparatus 100 completes the decision processing.

In contrast, if the initially written block information is not the initial value (No in Step S2102), the information recording apparatus 100 reads data in the x-th block that is indicated by the finally written block information included in the read management information (Step S2104). Then, the information recording apparatus 100 sets a writing destination region, which includes the x-th block as the head block, as the p-th writing destination region based on the read data in the x-th block (Step S2105).

In FIG. 22, the information recording apparatus 100 extracts the second bit of the head block in the p-th writing destination region (Step S2201). Next, the information recording apparatus 100 reads data in the block following the p-th writing destination region and extracts a value at the head position of the block following the p-th writing destination region (Step S2202). Then, the information recording apparatus 100 determines whether or not the extracted second bit and the extracted value at the head position of the block following the p-th writing destination region coincide with each other (Step S2203). Here, if the second bit and the value at the head position of the block following the p-th writing destination region coincide with each other (Yes in Step S2203), the information recording apparatus 100 moves on to processing in Step S2208.

In contrast, if the second bit and the value at the head position of the block following the p-th writing destination region do not coincide with each other (No in Step S2203), the information recording apparatus 100 sets, as the p+1-th writing destination region, a writing destination region which includes the block following the p-th writing destination region as the head block based on the data in the block following the p-th writing destination region (Step S2204).

Next, the information recording apparatus 100 extracts the third bit of the head block in the p+1-th writing destination region (Step S2205). Then, the information recording apparatus 100 reads the data in the termination block in the p+1-th writing destination region and extracts a value at the termination position of the termination block in the p+1-th writing destination region (Step S2206).

Next, the information recording apparatus 100 determines whether or not the extracted third bit and the extracted value at the termination position of the termination block in the p+1-th writing destination region coincide with each other (Step S2207). Here, if the third bit and the value at the termination position of the termination block in the p+1-th writing destination region coincide with each other (Yes in Step S2207), the information recording apparatus 100 decides the termination block of the p-th writing destination region as the termination position of the data writing (Step S2208) and completes the decision processing.

In contrast, if the third bit and the value at the termination position of the termination block in the p+1-th writing destination region do not coincide with each other (No in Step S2207), the information recording apparatus 100 sets the p+1-th writing destination region as the p-th writing destination region (Step S2209) and returns to the processing in Step S2201. In doing so, the information recording apparatus 100 can decide the termination position of the data writing. As a result, when new writing target data is written, the information recording apparatus 100 can specify, as the newest writing start position, a head position of a block following the termination position of the data writing and can write the new writing target data. In addition, the information recording apparatus 100 can specify the range of the storage region, in which the writing has already been performed, in the ring buffer and can read the data from the blocks, in which the writing has already been performed, in the ring buffer.

As described above, according to the information recording apparatus 100, it is possible to generate writing target data which includes the first information, the second information, and the target data and corresponds to the first number of blocks and to write the writing target data from the writing start position. In doing so, the information recording apparatus 100 can write, along with the target data 120, the first information which depends on whether or not writing of the current writing target data has been started and changes a state in relation to whether or not the first information coincides with at least an arbitrary value of the termination block 113 in the writing destination region 112. Similarly, the information recording apparatus 100 can write, along with the target data 120, the second information which depends on whether or not writing of the next writing target data has been started and changes a state in relation to whether or not the second information coincides with at least an arbitrary value of the writing scheduled block 114 of the next writing target data.

Therefore, the information recording apparatus 100 can achieve a state in which it is possible to determine whether or not the writing of the current writing target data has been written and whether or not the writing of the next writing target data has been started, based on the first information and the second information without updating the management information. Accordingly, the information recording apparatus 100 can specify the termination position of the data writing without writing the management information in a storage region that is different from the ring buffer. As a result, the information recording apparatus 100 can reduce the time for the writing processing.

According to the information recording apparatus 100, it is possible to use information that indicates a value at the first position on the termination block as the first information. Furthermore, according to the information recording apparatus 100, it is possible to generate writing target data that include third information indicating a different value from the value that is indicated by the first information, as a value to be written at the first position on the termination block. In doing so, the information recording apparatus 100 can fix a change in the state in relation to whether or not the first information and the value of the termination block 113 coincide with each other such that the value of the termination block 113 in the writing destination region 112 changes every time the current writing target data has successfully been written.

According to the information recording apparatus 100, it is possible to use information indicating a value at the second position on the block, which follows the termination block with the second number of blocks interposed therebetween, as the second information. Furthermore, according to the information recording apparatus 100, it is possible to generate, as a value to be written at the second position on the block, which follows the block immediately before the writing start position with the second number of blocks interposed therebetween, writing target data that includes fourth information indicating a different value from the value to be written at the second position. In doing so, the information recording apparatus 100 can cause the value of the writing scheduled block 114 of the next writing target data to change every time the writing of the next writing target data is started. In addition, the information recording apparatus 100 can fix a change in the state in relation to whether or not the second information and the value of the writing scheduled block 114 coincide with each other.

According to the information recording apparatus 100, it is possible to change the value, which is to be written at the first position on the termination block, in the target data to a different value if the value at the first position on the termination block and the value, which is to be written at the first position on the termination block, in the target data coincide with each other. Furthermore, according to the information recording apparatus 100, it is possible to generate writing target data that includes fifth information indicating whether or not the value, which is to be written at the first position on the termination block, in the target data has been changed. In doing so, the information recording apparatus 100 can use the value of the target data as the third information and can hold the fifth information, which indicates that the target data has been changed, in the writing target data such that the target data can be restored when the value of the target data is changed and is then read.

According to the information recording apparatus 100, it is possible to include the first information and the second information in the writing target data, as information to be written in the block, which follows the block immediately before the writing start position with the second number of blocks interposed therebetween. In doing so, the information recording apparatus 100 can include the first information and the second information in a range of data, in which it is possible to guarantee that the writing is successfully performed, in the current writing target data based on the second information in previous writing target data if there is previous writing target data. As a result, the information recording apparatus 100 can avoid a situation in which the first information and the second information are not written and specifying of the termination position of the data writing is not available.

According to the information recording apparatus 100, it is possible to set a number based on the size of the target data as the first number of blocks. In doing so, the information recording apparatus 100 can generate the writing target data to have a length that is longer than the size of the target data. Therefore, the size of the target data may be variable.

According to the information recording apparatus 100, it is possible to set "1" as the second number of blocks. In doing so, the information recording apparatus 100 can use, as the second information, the value of the writing scheduled block that is scheduled to be a writing destination of the writing target data in the next writing processing.

According to the information recording apparatus 100, it is possible to record information that indicates the termination block of the writing destination region of the writing target data as the termination position of the storage region, in which the writing has already been performed, in a volatile storage medium that is different from the storage medium when the writing of the writing target data is completed. In doing so, the information recording apparatus 100 does not have to specify the termination position of the data writing by using the first information and the second information every time writing processing of new data is performed, and can reduce the processing load.

According to the information recording apparatus 100, it is possible to read the first information and the second information of arbitrary data as long as writing has already been performed in the block, which follows the block immediately before the writing start position of the arbitrary writing target data with the second number of blocks interposed therebetween. In addition, according to the information recording apparatus 100, it is possible to specify the termination position of the data writing based on the read first information and the second information. Furthermore, the information recording apparatus 100 can decide a writing start position of writing target data, which includes new data, on the storage medium. In doing so, the information recording apparatus 100 can specify the termination position of the data writing and decide the newest writing start position even if the management information is not updated to the newest state.

According to the information recording apparatus 100, it is possible to determine whether or not writing has already been performed in the termination block, based on the value that is indicated by the first information and the value of the termination block. In addition, according to the information recording apparatus 100, it is possible to determine whether or not writing has already been performed in the block, which follows the termination block with the second number of blocks interposed therebetween, based on the value that is indicated by the second information and the value of the block, which follows the termination block with the second number of blocks interposed therebetween. In addition, according to the information recording apparatus 100, there is a case where the writing has not been performed in the block, which follows the termination block with the second number of blocks interposed therebetween, and that the writing has already been performed in the termination block. In such a case, the information recording apparatus 100 can decide the termination block as the termination position of the data writing. In doing so, the information recording apparatus 100 can specify that the writing of the writing target data from the reading source has already been performed and writing of writing target data following the writing target data has not been started or has been failed, and can specify the termination position of the data writing. Furthermore, the information recording apparatus 100 can decide the head position of the block following the writing destination region of the writing target data from the reading source as a writing start position of writing target data that includes new data.

According to the information recording apparatus 100, there is a case where writing has not been performed in the block, which follows the termination block with the second number of blocks interposed therebetween, and that writing has not been performed in the termination block. In such a case, the information recording apparatus 100 can decide the block immediately before the writing destination region of the writing target data from the reading source as the termination position of the data writing. In doing so, the information recording apparatus 100 can specify that the writing of the writing target data from the reading source has been failed, and can specify the termination position of the data writing. Furthermore, the information recording apparatus 100 can decide the writing start position of the writing target data from the reading source as the writing start position of the writing target data that includes the new data.

According to the information recording apparatus 100, it is possible to record information that indicates the termination block of the writing destination region of the writing target data, the writing of which has been immediately previously completed, in another storage region that is different from the contiguous storage regions when a request for stopping power supply is received. In doing so, the information recording apparatus 100 can reduce the processing load for specifying the termination position of the data writing when the power is turned on next time.

According to the information recording apparatus 100, it is possible to determine whether or not the information that is recorded in another storage region indicates that writing has already been performed in the block, which follows the block immediately before the writing start position with the second number of blocks interposed therebetween, when the information recording apparatus 100 recovers from the state in which the power supply is stopped. In addition, according to the information recording apparatus 100, it is possible to read the first information and the second information that are written up to the block, which follows the previous block with the second number of blocks interposed therebetween, as long as the information recorded in another storage region indicates that the writing has already been performed in the block, which follows the block immediately before the writing start position with the second number of blocks interposed therebetween. In doing so, the information recording apparatus 100 can read at least writing target data, the information recording apparatus 100 can read the writing target data that is arbitrary writing target data and includes at least the first information and the second information, writing of which is guaranteed, and can read the first information and the second information in the arbitrary writing target data. Then, the information recording apparatus 100 can determine whether or not the writing of the arbitrary writing target data has been completed and whether or not writing of next writing target data following the arbitrary writing target data has been started, and can specify the termination position of the data writing. Furthermore, the information recording apparatus 100 can specify the writing start position of the new writing target data.

According to the information recording apparatus 100, it is possible to read writing target data written in the storage medium. In addition, according to the information recording apparatus 100, it is possible to change a value, which is read from the first position on the termination block, in the data to a value before change when the fifth information that is included in the writing target data indicates that the value, which is to be written at the first position on the termination block, in the data has been changed. In doing so, the information recording apparatus 100 can read the arbitrary writing target data and can obtain the target data that is included in the writing target data. In addition, the information recording apparatus 100 can restore the target data when the value of the target data has been changed.

According to the information recording apparatus 100, it is possible to employ a magnetic disk as the storage medium. In such a case, the information recording apparatus 100 does not have to write the management information in the storage medium that is different from the ring buffer, and has only to write data in the ring buffer as the contiguous storage regions. Therefore, it is possible to reduce a seek time.

According to the information recording apparatus 100, it is possible to employ a semiconductor memory as the storage medium. In such a case, the information recording apparatus 100 can reduce the number of times the information recording apparatus 100 writes the management information in the storage region that is different from the ring buffer. Therefore, it is possible to suppress degradation in the semiconductor memory.

According to the information recording apparatus 100, it is possible to divide the writing target data into first data that includes data to be written in a block, which follows the previous block with the second number of blocks interposed therebetween, and second data that includes data to be written in the termination block. In addition, according to the information recording apparatus 100, it is possible to write the second data after completion of the writing of the first data. In doing so, the information recording apparatus 100 can achieve a state in which it is possible to determine whether or not the writing of the current writing target data has been completed based on the first information and the second information even in a case in which the storage device does not write data in the storage medium in an order from the head of the writing target data. In addition, the information recording apparatus 100 can achieve a state in which it is possible to determine whether or not writing of the next writing target data has been started.

The information recording method described above in the embodiment can be realized by a computer, such as a personal computer or a work station, executing a program prepared in advance. The information recording program is recorded in a computer readable recording medium, such as a hard disk, a flexible disk, a CD-ROM, an MO, or a DVD, and is read from the recording medium and executed by the computer. In addition, the information recording program may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An apparatus comprising:
processing circuitry configured to
extract first information from a first target data which includes a plurality of data blocks, the first information corresponding to third information which is included in a last data block of the plurality of data blocks, the first target data being to be written to a first segment of a storage medium;

extract second information from a second target data which is to be written to a second segment of the storage medium after writing the first target data to the first segment, the second information corresponding to fourth information which is included in the second target data;

generate first write data by adding the first information and the second information to the first target data; and write the first write data to the first segment of the storage medium.

2. The apparatus according to claim 1, wherein the first information and the second information are stored in a header block of the first write data.

3. The apparatus according to claim 1, wherein the first information indicates a value obtained by inverting the value of the third information, and wherein the second information indicates a value obtained by inverting the value of the fourth information.

4. The apparatus according to claim 3, wherein the processing circuitry is further configured to generate the first write data by adding firth information to the first target data, the fifth information indicating whether or not a value stored in the first information and a value stored in the third information have changed.

5. The apparatus according to claim 1, wherein the third information is a last bit of the last data block included in the first target data, and the first information indicates a value obtained by inverting the value of the third information.

6. The apparatus according to claim 1, wherein the fourth information is a first bit of a first data block of a plurality of data blocks included in the second target data, and the second information indicates a value obtained by inverting the value of the fourth information.

7. A method comprising:

extracting, by a processing circuitry, first information from a first target data which includes a plurality of data blocks, the first information corresponding to third information which is included in a last data block of the plurality of data blocks, the first target data being to be written to a first segment of a storage medium;

extracting, by the processing circuitry, second information from a second target data which is to be written to a second segment of the storage medium after writing the first target data to the first segment, the second information corresponding to fourth information which is included in the second target data;

generating, by the processing circuitry, first write data by adding the first information and the second information to the first target data; and writing the first write data to the first segment of the storage medium.

8. The method according to claim 7, wherein the first information and the second information are stored in a header block of the first write data.

9. The method according to claim 7, wherein the first information indicates a value obtained by inverting the value of the third information, and wherein the second information indicates a value obtained by inverting the value of the fourth information.

10. The method according to claim 9, wherein the generating of the first write data includes adding firth information to the first target data, the fifth information indicating whether or not a value stored in the first information and a value stored in the third information have changed.

11. The method according to claim 7, wherein the third information is a last bit of the last data block included in the first target data, and the first information indicates a value obtained by inverting the value of the third information.

12. The method according to claim 7, wherein the fourth information is a first bit of a first data block of a plurality of data blocks included in the second target data, and the second information indicates a value obtained by inverting the value of the fourth information.

13. A non-transitory computer readable medium having stored therein a program that causes a computer to execute a process, the process comprising:

extracting first information from a first target data which includes a plurality of data blocks, the first information corresponding to third information which is included in a last data block of the plurality of data blocks, the first target data being to be written to a first segment of a storage medium;

extracting second information from a second target data which is to be written to a second segment of the storage medium after writing the first target data to the first segment, the second information corresponding to fourth information which is included in the second target data;

generating first write data by adding the first information and the second information to the first target data; and writing the first write data to the first segment of the storage medium.

14. The method according to claim 13, wherein the first information and the second information are stored in a header block of the first write data.

15. The method according to claim 13, wherein the first information indicates a value obtained by inverting the value of the third information, and wherein the second information indicates a value obtained by inverting the value of the fourth information.

16. The method according to claim 15, wherein the generating of the first write data includes adding firth information to the first target data, the fifth information indicating whether or not a value stored in the first information and a value stored in the third information have changed.

17. The method according to claim 13, wherein the third information is a last bit of the last data block included in the first target data, and the first information indicates a value obtained by inverting the value of the third information.

18. The method according to claim 13, wherein the fourth information is a first bit of a first data block of a plurality of data blocks included in the second target data, and the second information indicates a value obtained by inverting the value of the fourth information.

* * * * *